US011489233B2

(12) United States Patent
Ito et al.

(10) Patent No.: US 11,489,233 B2
(45) Date of Patent: Nov. 1, 2022

(54) NONAQUEOUS ELECTROLYTE BATTERY INORGANIC PARTICLES, AND NONAQUEOUS ELECTROLYTE BATTERY USING THESE

(71) Applicant: Asahi Kasei Kabushiki Kaisha, Tokyo (JP)

(72) Inventors: Nobuhiro Ito, Tokyo (JP); Hiroyuki Saeki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/465,777

(22) PCT Filed: Aug. 30, 2017

(86) PCT No.: PCT/JP2017/031200
§ 371 (c)(1),
(2) Date: May 31, 2019

(87) PCT Pub. No.: WO2018/100815
PCT Pub. Date: Jun. 7, 2018

(65) Prior Publication Data
US 2019/0296305 A1    Sep. 26, 2019

(30) Foreign Application Priority Data

Dec. 2, 2016  (JP) .............................. JP2016-235126

(51) Int. Cl.
*H01M 2/16*    (2006.01)
*H01M 50/431*    (2021.01)
(Continued)

(52) U.S. Cl.
CPC ........... *H01M 50/431* (2021.01); *H01M 4/13* (2013.01); *H01M 4/62* (2013.01); *H01M 10/052* (2013.01);
(Continued)

(58) Field of Classification Search
CPC .......... H01M 10/052; H01M 10/0525; H01M 10/0567; H01M 4/13; H01M 4/62;
(Continued)

(56) References Cited

U.S. PATENT DOCUMENTS

2009/0030100 A1    1/2009  Nagamatsu et al.
2010/0015530 A1    1/2010  Katayama et al.
(Continued)

FOREIGN PATENT DOCUMENTS

CN    104380499 A    2/2015
CN    105706270 A1   6/2016
(Continued)

OTHER PUBLICATIONS

Supplementary Partial European Search Report issued in corresponding European Patent Application No. 17875792.8 dated Dec. 6, 2019.
(Continued)

*Primary Examiner* — Victoria H Lynch
(74) *Attorney, Agent, or Firm* — Morgan, Lewis & Bockius LLP

(57) ABSTRACT

A purpose of the present disclosure is to provide nonaqueous electrolyte battery inorganic particles that enable provision of a nonaqueous electrolyte battery having excellent properties of safety and service life. Another purpose of the present disclosure is to provide an efficient and effective method for inspecting the metal absorption ability of nonaqueous electrolyte battery inorganic particles.

18 Claims, 1 Drawing Sheet

(51) Int. Cl.
*H01M 10/0525* (2010.01)
*H01M 4/13* (2010.01)
*H01M 10/052* (2010.01)
*H01M 10/0567* (2010.01)
*H01M 4/62* (2006.01)
*H01M 50/10* (2021.01)
*H01M 50/409* (2021.01)
*H01M 50/449* (2021.01)
*H01M 4/66* (2006.01)

(52) U.S. Cl.
CPC ... *H01M 10/0525* (2013.01); *H01M 10/0567* (2013.01); *H01M 50/10* (2021.01); *H01M 50/409* (2021.01); *H01M 50/449* (2021.01); *H01M 4/66* (2013.01); *Y02E 60/10* (2013.01); *Y02T 10/70* (2013.01)

(58) Field of Classification Search
CPC ...... H01M 4/66; H01M 50/10; H01M 50/409; H01M 50/431; H01M 50/449; Y02E 60/10; Y02T 10/70
See application file for complete search history.

(56) References Cited

U.S. PATENT DOCUMENTS

| | | | |
|---|---|---|---|
| 2012/0070714 A1* | 3/2012 | Chambers | H01M 50/446 429/145 |
| 2014/0322586 A1 | 10/2014 | Lee et al. | |
| 2016/0013515 A1 | 1/2016 | Lee et al. | |
| 2016/0111698 A1 | 4/2016 | Lee et al. | |
| 2016/0156028 A1 | 6/2016 | Je et al. | |
| 2016/0344009 A1 | 11/2016 | Suzuki et al. | |
| 2016/0365559 A1 | 12/2016 | Yoshimaru et al. | |
| 2016/0372728 A1 | 12/2016 | Yoshimaru et al. | |
| 2017/0162849 A1 | 6/2017 | Murakami et al. | |

FOREIGN PATENT DOCUMENTS

| | | |
|---|---|---|
| EP | 1120850 A1 | 8/2001 |
| JP | 2000-077103 A | 3/2000 |
| JP | 2001-222987 A | 8/2001 |
| JP | 2003-197477 A | 7/2003 |
| JP | 2004-185956 A | 7/2004 |
| JP | 2011-018588 A | 1/2011 |
| JP | 2012-09165 A | 1/2012 |
| JP | 2013-114764 A | 6/2013 |
| JP | 2016-108210 A | 6/2016 |
| JP | 5973674 B | 8/2016 |
| JP | 5973675 B | 8/2016 |
| JP | 5976947 B | 8/2016 |
| KR | 2008-0098594 A | 11/2008 |
| KR | 2012-0001809 A | 1/2012 |
| KR | 10-2014-0070484 A | 6/2014 |
| KR | 2016-0063912 A | 6/2016 |
| WO | 2013/015228 A1 | 1/2013 |
| WO | 2014/001899 A1 | 1/2014 |
| WO | 2015/111230 A1 | 7/2015 |
| WO | 2016/056289 A1 | 4/2016 |

OTHER PUBLICATIONS

International Search Report issued in corresponding International Patent Application No. PCT/JP2017/031200 dated Nov. 7, 2017.

International Preliminary Report on Patentability and Written Opinion issued in corresponding International Patent Application No. PCT/JP2017/031200 dated Jun. 4, 2019.

English translation of Notification of Designation of Cancellation Request No. and Tribunal Examiners filed Oct. 15, 2021 in corresponding Korean Patent Application No. 102241566.

* cited by examiner

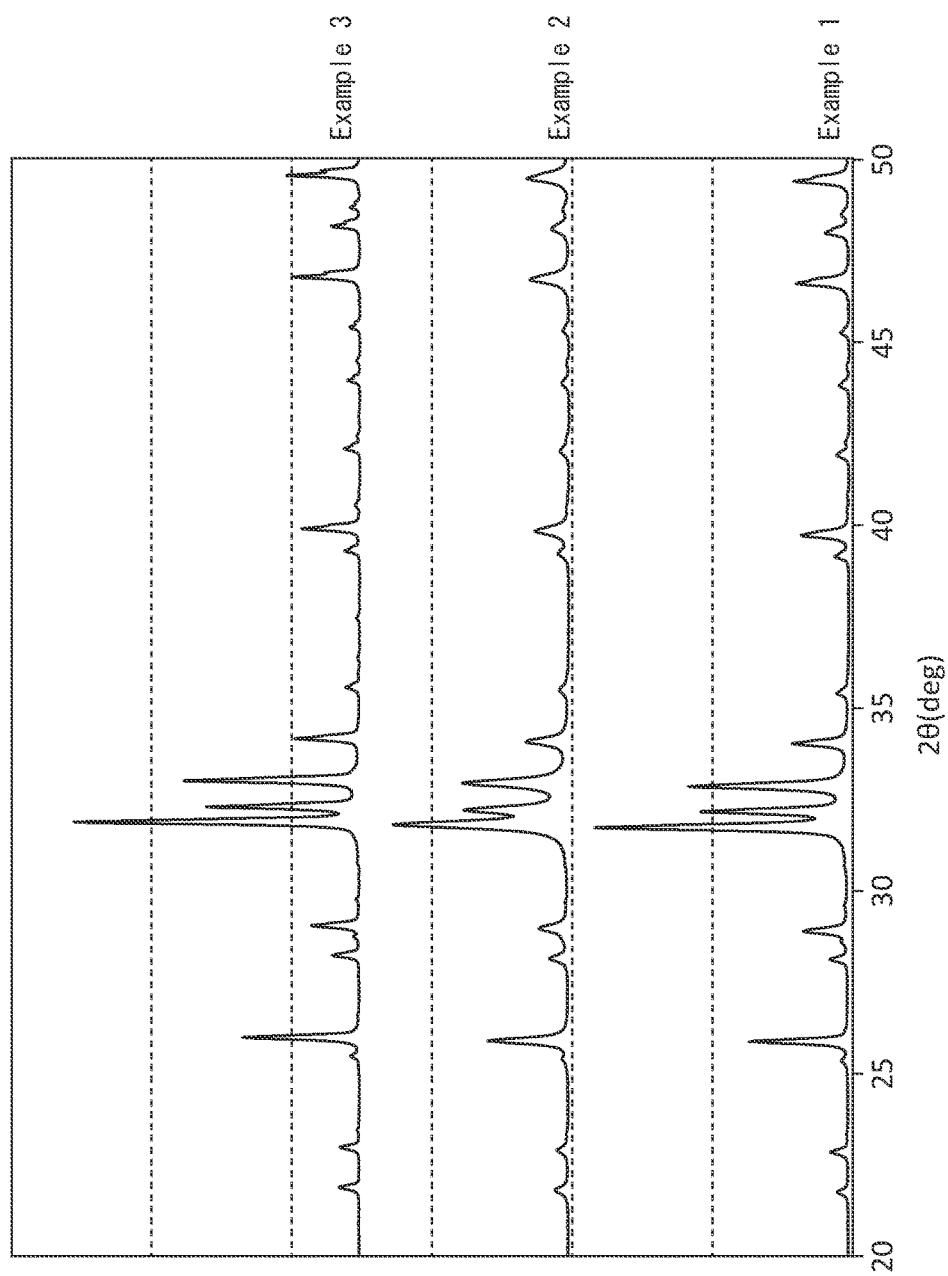

NONAQUEOUS ELECTROLYTE BATTERY INORGANIC PARTICLES, AND NONAQUEOUS ELECTROLYTE BATTERY USING THESE

FIELD

The present invention relates to inorganic particles for a nonaqueous electrolyte battery and a nonaqueous electrolyte battery using thereof.

BACKGROUND

Due to the development of electronic technology, or the growing interest in environmental technology in recent years, various electrochemical devices are used. In particular, requests for energy saving, and expectations for electrochemical devices that can contribute to the above have been increasing more and more.

A lithium ion secondary battery which is a representative example of a power storage device, and also a representative example of a nonaqueous electrolyte battery, has been conventionally used mainly as a power source for a miniature device, but in recent years, it has drawn attention as a power source for a hybrid vehicle or an electric vehicle.

With respect to a lithium ion secondary battery, increase in energy density is advancing along with enhancement of device performances, and reliability is becoming more important. In particular, in the case of a medium- or large-sized lithium-ion secondary battery such as an automotive onboard power source, it is essential to ensure higher reliability than in the case of miniature devices. Furthermore, as the automotive onboard power source, a lithium ion secondary battery capable of maintaining charge/discharge capacitance for a long period of time in accordance with a product cycle, is required.

For example, Patent Literature 1 describes a slurry that is used for forming an insulating layer having ion permeability and heat resistance, and contains heat resistant fine particles, at least a portion of which is apatite with a pH of 7 to 11, a thickener and a medium.

Patent Literature 2 describes a laminate in which a porous layer containing fine particles is laminated at least on one surface of a porous film mainly comprising polyolefin, with a specific range of the difference between the test force at the time of conduction of the laminate and the test force at the time of dielectric breakdown in a nail penetration conduction test under the measurement condition of a nail descending speed of 50 μm/minute using a nail N50 prescribed in JIS A5508.

Patent Literature 3 describes a laminate in which a porous layer containing fine particles is laminated at least on one surface of a porous film comprising mainly polyolefin, with a specific range of displacement of the laminate in the thickness direction from dielectric breakdown to conduction in the nail penetration conduction test under the measurement condition of a nail descending speed of 50 μm/minute using a nail N50 prescribed in JIS A5508.

Patent Literature 4 describes a porous layer for a separator of a nonaqueous electrolyte secondary battery having specific porosity variation ratios and containing specific resins, such as polyolefin and a filler having a specific range of a volume-average particle size.

CITATION LIST

Patent Literature

[Patent Literature 1] Japanese Unexamined Patent Publication (Kokai) No. 2011-018588

[Patent Literature 2] Japanese Patent Publication No. 5973674

[Patent Literature 3] Japanese Patent Publication No. 5973675

[Patent Literature 4] Japanese Patent Publication No. 5976947

SUMMARY

Technical Problem

In a nonaqueous electrolyte battery, there is a case that a metal ion present or being generated in the system, creates an adverse effect on safety and life characteristics of a battery. For example, in a lithium ion secondary battery, a lithium (Li) ion moves between a positive electrode and a negative electrode to carry out charge and discharge. However, it has been known that, if a trace amount of metal ions other than a Li ion, such as cobalt ion ($Co^{2+}$), nickel ion ($Ni^{2+}$), and manganese ion ($Mn^{2+}$) is present in the battery, these metals may deposit on the negative electrode surface to cause reduction in the battery life, or the deposited metal may break a separator and reach the positive electrode to cause a short circuit or deterioration of the safety. Such metal ions are sometimes originated from impurities in a battery constituent material, and additionally some are derived by elution of a metal contained in the battery constituent material, such as a positive electrode active material, etc. into a nonaqueous electrolyte as the result of a side reaction in the battery. For example, hydrofluoric acid (HF) is generated by the decomposition reaction, etc. of the nonaqueous electrolyte and the metal contained in the positive electrode active material is sometimes eluted by HF. Furthermore, it is pointed out that such metal elution is more pronounced when the battery is exposed to elevated temperatures.

Moreover, when investigating a material for adsorbing a metal ion, the following methods are applied such as (i) a method for placing the material in a battery and inspecting an amount of a deposited metal in a negative electrode after charge/discharge, (ii) a method of feeding the material in a cyclic and/or a linear carbonate solution containing a metal ion and not containing an electrolyte, and inspecting an amount of a decreased metal ion. However, there are problems in the (i) method that is complicated for assembling a battery and requires time for investigating a material, and in the (ii) method where a lithium ion that has a possibility to inhibit adsorption of a metal ion, is not contained and adsorption reaction can not be reproduced in an actual battery.

One of the problems to be solve in the present invention is to provide inorganic particles for a nonaqueous electrolyte battery capable of providing the nonaqueous electrolyte battery superior in safety and life characteristics. Further, the purpose of the present invention is also to provide an efficient and viable method for inspecting a metal adsorption capacity of the inorganic particles for a nonaqueous electrolyte battery.

Solution to Problem

As a result of an intensive research for solving the aforementioned problems, the present inventors have found to be able to provide a nonaqueous electrolyte battery superior in safety and life characteristics by using inorganic particles for a nonaqueous electrolyte battery including a cation exchanger having a highly crystallized one-dimensional tunnel-like crystal structure. Further, the present inventors have found to be able to inspect efficiently and viably a metal adsorption capacity of the inorganic particles for a nonaqueous electrolyte battery by the method including preparing a nonaqueous electrolyte solution containing a specific concentration of metal ions; preparing a nonaqueous electrolyte mixture solution by adding a specific amount of the inorganic particles for a nonaqueous electrolyte battery to the nonaqueous electrolyte solution; stirring the nonaqueous electrolyte mixture solution under specific conditions; and carrying out quantitative analysis of metal ions in the nonaqueous electrolyte mixture solution after stirring using a specific apparatus.

Namely, the present invention is as follows.

[1]
Inorganic particles for a nonaqueous electrolyte battery, comprising a cation exchanger having a highly crystallized one-dimensional tunnel-like crystal structure.

[2]
The inorganic particles for a nonaqueous electrolyte battery according to [1], wherein the cation exchanger having a highly crystallized one-dimensional tunnel-like crystal structure is one or more selected from the group consisting of hydroxyapatite, fluoroapatite, chlorapatite, protonated albite, manganese oxide, β-alumina, potassium hexatitanate, potassium tungstate, potassium molybdate, octotitanate, and gallotitanogallate.

[3]
The inorganic particles for a nonaqueous electrolyte battery according to [1] or [2], wherein the cation exchanger having a highly crystallized one-dimensional tunnel-like crystal structure is hydroxyapatite, and the hydroxyapatite has a diffraction peak of the (002) plane within the diffraction angle ($2\theta$) of from 25.5 to 26.5° and a diffraction peak of the (300) plane within the diffraction angle ($2\theta$) of from 32.5 to 33.5°, and a half width of the diffraction peak of the (002) plane is 0.3° or less, in an X-ray diffraction pattern by X-ray diffraction measurement using Cu—K$\alpha$ ray as a light source.

[4]
The inorganic particles for a nonaqueous electrolyte battery according to [3], wherein the half width of the diffraction peak of the (002) plane is 0.15° or less.

[5]
The inorganic particles for a nonaqueous electrolyte battery according to any one of [1] to [4], wherein a BET specific surface area is 3 $m^2$/g or more.

[6]
The inorganic particles for a nonaqueous electrolyte battery according to any one of [1] to [5], wherein an adsorption rate of $Mn^{2+}$ ions to the inorganic particles for a nonaqueous electrolyte battery is 10% or more, when 0.035 parts by weight of the inorganic particles for a nonaqueous electrolyte battery is immersed in 100 parts by weight of a mixed solution of 5 ppm of $Mn^{2+}$ ions, 1 mol/L of $LiPF_6$, and a cyclic and/or a linear carbonate at 23° C. for 6 hours.

[7]
The inorganic particles for a nonaqueous electrolyte battery according to any one of [1] to [6], further containing inorganic particles for mixing.

[8]
The inorganic particles for a nonaqueous electrolyte battery according to [7], wherein an average thickness of the inorganic particles for mixing is thicker than that of the cation exchanger.

[9]
The inorganic particles for a nonaqueous electrolyte battery according to [7] or [8], wherein the inorganic particles for mixing are an anion exchanger.

[10]
The inorganic particles for a nonaqueous electrolyte battery according to any one of [7] to [9], wherein an amount of the inorganic particles for mixing is less than 50% by weight based on 100% by weight of the total weight of the cation exchanger and the inorganic particles for mixing.

[11]
A battery constituent material comprising the inorganic particles for a nonaqueous electrolyte battery according to any one of [1] to [10].

[12]
A nonaqueous electrolyte battery comprising an inorganic particle-containing layer containing the inorganic particles for a nonaqueous electrolyte battery according to any one of [1] to [10].

[13]
A nonaqueous electrolyte battery comprising a positive electrode, a negative electrode, a separator, a nonaqueous electrolyte, and an outer package, wherein at least one of the positive electrode, the negative electrode, the separator, the nonaqueous electrolyte, and the outer package contains the inorganic particles for a nonaqueous electrolyte battery according to any one of [1] to [10].

[14]
The nonaqueous electrolyte battery comprising the positive electrode, the negative electrode, and the separator according to [12], wherein the inorganic particle-containing layer is formed partially or entirely at least one selected from: inside of the separator, between the positive electrode and the negative electrode, or between the negative electrode and the separator.

[15]
The nonaqueous electrolyte battery according to [14], wherein the inorganic particle-containing layer is formed partially or entirely between the positive electrode and the separator.

[16]
A separator for a nonaqueous electrolyte battery, comprising the inorganic particles for a nonaqueous electrolyte battery according to any one of [1] to [10].

[17]
A separator for a nonaqueous electrolyte battery, comprising the inorganic particle-containing layer according to [12] on at least one surface of the separator.

[18]
A paint for a nonaqueous electrolyte battery, comprising the inorganic particles for a nonaqueous electrolyte battery according to any one of [1] to [10].

[19]
A resin solid material for a nonaqueous electrolyte battery, comprising the inorganic particles for a nonaqueous electrolyte battery according to any one of [1] to [10] and a resin.

[20]
A lithium ion secondary battery comprising a laminated body or a roll of the laminated body, and a nonaqueous electrolyte, wherein a positive electrode, the inorganic particle-containing layer containing the inorganic particles for a nonaqueous electrolyte battery according to any one of [1] to [10], a separator, and a negative electrode are laminated in this order.

[21]
An inspection method for a metal adsorption capacity of inorganic particles for a nonaqueous electrolyte battery, wherein, the method comprises:

preparing a nonaqueous electrolyte solution having a metal concentration of 0.1 to 10,000 ppm by adding a metal compound to a cyclic and/or a linear carbonate solution containing 0.1 to 6.0 mol/L of $LiPF_6$ at a dew point of −40° C. or lower;

preparing a nonaqueous electrolyte mixture solution by adding 0.001 to 100 parts by weight of the inorganic particles for a nonaqueous electrolyte battery to 100 parts of the nonaqueous electrolyte solution;

stirring the nonaqueous electrolyte mixture solution at 0 to 45° C. for 1 second to 1000 hours; and carrying out quantitative analysis of the metal ion concentration in the nonaqueous electrolyte mixture solution after stirring using an inductively coupled plasma-atomic emission spectroscopy (ICP-AES) or an inductively coupled plasma-mass spectrometry (ICP-MS).

Advantageous Effects of Invention

Since the inorganic particles for a nonaqueous electrolyte battery according to the present invention are capable of efficiently adsorbing metal ions present or happened to be generated in the nonaqueous electrolyte battery, it is possible to provide the nonaqueous electrolyte battery superior in safety and life characteristics.

BRIEF DESCRIPTION OF DRAWINGS

FIG. 1 is a diagram showing a X ray diffraction pattern of hydroxyapatite used in Examples 1 to 3, obtained by X-ray diffraction measurement using Cu—Kα ray as a light source.

DESCRIPTION OF EMBODIMENTS

Embodiments for implementing the present inventions (hereinafter simply referred to as "embodiments") will be described below in detail. The following embodiments are just examples for explaining the present invention and are not intended to limit the present invention to the following contents. The present invention may be implemented with appropriate modifications within the scope of its gist.

<<Nonaqueous Electrolyte Battery>>

The nonaqueous electrolyte battery of the present embodiment more preferably comprises an inorganic particle-containing layer containing the inorganic particles for a nonaqueous electrolyte battery of the present embodiment. A nonaqueous electrolyte battery generally has a positive electrode, a negative electrode, a separator, a nonaqueous electrolyte, and an outer package. In one embodiment, at least one of the positive electrode, the negative electrode, the separator, the non-aqueous electrolyte, and the outer package preferably comprises the inorganic particles for a non-aqueous electrolyte battery of the present embodiment. More preferably, the separator comprises the inorganic particles for a nonaqueous electrolyte battery of the present embodiment. As a specific method for adding the inorganic particles to the separator, the inorganic particles may be added in the separator, for example, in a microporous membrane or a nonwoven fabric as a base material. Moreover, the inorganic particle-containing layer comprising the inorganic particles for a nonaqueous electrolyte battery of the present embodiment may be placed on one side or both sides of the microporous membrane or nonwoven fabric as a base material of the separator. It is preferable that the inorganic particle-containing layer is formed partially or entirely at least either inside the separator, between the positive electrode and the separator, and between the negative electrode and the separator, and it is more preferable that the layer is formed partially or entirely between the positive electrode and the separator. In the present description, a lithium ion secondary battery may be described as an example of the nonaqueous electrolyte battery, however such description is intended only to aid the understanding of the present invention, and the nonaqueous electrolyte battery of the present embodiment is not restricted to a lithium ion secondary battery.

In the present description, the materials such as a positive electrode, a negative electrode, a separator, a nonaqueous electrolytic solution, and an outer package, are all referred to as "battery constituent material". With respect to the materials constituting the battery constituent material, for example, aluminum, etc. may be used for the outer package; nickel, cobalt, manganese, iron, zinc, copper, aluminum, etc. may be used for a positive electrode active material; and copper, aluminum, etc., may be typically used for a current collector foil. Such metals elute inside a battery as metal ions formed from the metals upon contact with HF. The eluted ions are reduced and deposited at a negative electrode to form a Li-containing compound which causes reduction in capacity in a Li ion secondary battery. As a result a problem of significantly reducing life characteristics of the battery may arise. By comprising specific inorganic particles described below, the nonaqueous electrolyte battery of the present embodiment is capable of adsorbing effectively a metal ion present or generated in the battery, suppressing elution of metals, and improving life characteristics of the battery. Furthermore, it also becomes possible to prevent the deposition of a metal in the negative electrode, which renders it possible to suppress a short circuit, and thereby contributes to improvement of safety.

<Inorganic Particles for Nonaqueous Electrolyte Battery>

In the present invention, at least one of a positive electrode, a negative electrode, a separator, a nonaqueous electrolyte, and an outer package contains inorganic particles. The inorganic particles for a nonaqueous electrolyte battery of the present embodiment comprise a cation exchanger having a highly crystallized one-dimensional tunnel-like crystal structure. In one embodiment, the inorganic particles for a nonaqueous electrolyte battery may be constituted by the cation exchanger having a highly crystallized one-dimensional tunnel-like crystal structure, in addition to the cation exchange having a highly crystallized one-dimensional tunnel-like crystal structure, it may further comprises inorganic particles for mixing described below, and it may be constituted by the cation exchanger having a highly crystallized one-dimensional tunnel-like crystal structure and the inorganic particles for mixing.

(Cation Exchanger)

In the present description, "a cation exchanger having a one-dimensional tunnel-like crystal structure" has a one-dimensional tunnel-type crystal structure, capable of adsorbing a cation present or generated in a battery in the tunnel, and of releasing another cation (also referred to as "exchangeable cation") that are instead present in the tunnel. Since the exchangeable cation is regularly aligned in one direction in the one-dimensional tunnel-type crystal structure, it tends to have high mobility within the crystal, and an excellent adsorption capability of another cation.

In the present description, "highly crystallized" means a peak shape derived from a one-dimensional tunnel-like crystal structure is sharp in X-ray diffraction measurement using Cu—Kα ray as a light source. More specifically, a half width of the peak derived from the one-dimensional tunnel-like crystal structure is 0.3° or less.

Since the one-dimensional tunnel-like crystal structure is highly crystallized, the exchangeable cation tends to have high mobility within the crystal and an excellent adsorption capability of another cation.

The cation exchanger having a one-dimensional tunnel-like crystal structure includes, however, is not restricted thereto, for example, hydroxyapatite $(Ca_{10}(PO_4)_6(OH)_2$, also referred to as "calcium hydroxyphosphate"), fluoroapatite $(Ca_{10}(PO_4)_6F_2)$, chlorapatite $(Ca_{10}(PO_4)_6Cl_2)$, protonated albite, manganese oxide (i.e., a Pyrolusite type, a Ramsdellite type, a Hollandite type, a Romanechite type, RUB-7 type, and Todorokite type), β-alumina, potassium hexatitanate, potassium tungstate, potassium molybdate, a mesoporous material (FSM-16, etc.), nanotubular aluminum silicate (imogolite, etc.), pridelite, octotitanate, and gallotitanogallate, etc.

Among them, since the following is highly crystallized, at least one of cation exchangers selected from the group consisting of hydroxyapatite, fluoroapatite, chlorapatite, protonated albite, manganese oxide, β-alumina, potassium hexatitanate, potassium tungstate, potassium molybdate, octotitanate and gallotitanogallates, is preferred.

From the viewpoint of preventing battery swelling, etc., hydroxyapatite is preferable as the cation exchanger having a one-dimensional tunnel-like crystal structure. The cation exchanger may be used singly, and two or more types thereof may be used in combination.

In hydroxyapatite, each site may be partially substituted with another element and/or element group if a highly crystallized one-dimensional tunnel-like crystal structure is maintained. For example, the Ca site can be substituted with an element such as Na, K, Rb, Cs, Mg, Zn, Ba, Y, V, Sb, Ge, Ti, etc. The $PO_4$ site can be substituted with an element group such as $SO_4$, $CO_3$, $HPO_4$, $AsO_4$, $VO_4$, $BO_3$, $CrO_4$, $SiO_4$, $GeO_4$, $BO_4$, etc. The OH site can be substituted by an element and/or an element group such as OH, F, Cl, Br, I, O, $CO_3$, $H_2O$, etc. The element and/or the group of elements may be of one type alone or of two or more types.

Hydroxyapatite preferably has, in X-ray diffraction measurement using Cu—Kα ray as a light source, a diffraction peak of the (002) plane appearing at the diffraction angle (2θ) of 25.5 to 26.5° and a diffraction peak of the (300) plane appearing at the diffraction angle (2θ) of 32.5 to 33.5°.

The half width of the diffraction peak of (002) plane of hydroxyapatite is preferably 0.3° or less, more preferably 0.2° or less, and still more preferably 0.15° or less.

There is no restriction as a method for obtaining hydroxyapatite, and a publicly known method can be used. Examples of the method for producing hydroxyapatite include a dry method and a wet method. The dry method is a method in which calcium carbonate, calcium pyrophosphate, calcium hydrogen phosphate, etc. are used as a raw material and subjected to heat treatment at an elevated temperature of about 1200° C. On the other hand, the wet method is a method in which a reaction is conducted in an aqueous solution, and hydroxyapatite is obtained by reacting calcium salt and phosphoric acid and/or phosphate under neutral to alkaline conditions, under around a normal pressure or hydrothermal conditions. The hydroxyapatite obtained by the wet method tends to be more superior in purity and crystallinity to by the dry method. The hydroxyapatite obtained by the wet method may be subjected to a calcination treatment at 200 to 1300° C. By performing the calcination treatment, it is possible to remove the adsorbed water causing battery swelling in a nonaqueous electrolyte battery, also to increase the crystallinity, and thereby to improve an adsorption capacity of the eluted ions.

(Inorganic Particles for Mixing)

In the present description, the "inorganic particles for mixing" refers to inorganic particles that can improve the dispersibility of the cation exchanger having a one-dimensional tunnel-like crystal structure. In the present embodiment, it is preferable that the inorganic particles contain not only the cation exchanger having a highly crystallized one-dimensional tunnel-like crystal structure but also the inorganic particles for mixing. Further, it is even preferable that an average thickness of the inorganic particles for mixing is thicker than that of the cation exchanger. The term "thickness" as used herein refers to a length of the particle in the shortest axial direction. The inorganic particles as well as the cation exchanger are capable of particularly enhancing the dispersibility of the cation exchanger and efficiently adsorbing metal ions, when the inorganic particles for mixing, which have such a specific average thickness, are contained.

The method for measuring the average thickness of the particles is not particularly restricted, and for example, it can be measured by observing lengths of 100 particles in the shortest axis direction with a transmission electron microscope and calculating an average thickness.

The inorganic particles for mixing is not restricted, and for example, it is the preferable that inorganic particles have a melting point of 200° C. or higher and high electrical insulation, and are electrochemically stable in the use range of a nonaqueous electrolyte battery.

Such inorganic particle is not particularly restricted, and for example, the inorganic particles comprise one selected from the group consisting of anion exchangers, cation exchangers, such as zirconium phosphate, titanium phosphate, titanate, niobate, niobate•titanate, zeolite, etc.; carbonates and sulfates, such as calcium sulfate, magnesium sulfate, aluminum sulfate, gypsum, barium sulfate, etc., oxide-based ceramics, such as alumina trihydrate (ATH), fumed silica, precipitated silica, yttria, etc., sodium oxide, potassium oxide, magnesium oxide, calcium oxide, barium oxide, strontium oxide, vanadium oxide, $SiO_2$—MgO (magnesium silicate), $SiO_2$—CaO (calcium silicate), sodium carbonate, potassium carbonate, magnesium carbonate, calcium carbonate, barium carbonate, lanthanum carbonate, cerium carbonate, nitride-based ceramics, such as silicon nitride, titanium nitride, boron nitride, etc., magnesium hydroxide, layered silicates, such as silicon carbide, talc, dickite, nacrite, halloysite, pyrophyllite, montmorillonite, sericite, amesite, bentonite, etc., synthetic layered silicates, such as asbestos, diatomite, glass fiber, etc., neutral layered silicates, such as mica or fluoromica, etc., natural and synthetic layered silicates containing a modifier that improves intercalation and delamination, such as hectorite, saponite or vermiculite, and nanoclay, etc., and zinc borate.

The inorganic particles for mixing are preferably an anion exchanger. In the present description, "anion exchanger" refers to a material capable of adsorbing anions present or generated in a battery and instead releasing another anion. It is more preferable that the inorganic particles for mixing being the anion exchanger are capable of not only improving the dispersibility of the cation exchanger in an inorganic particle layer, but also adsorbing metal ions more efficiently. As for a specific mechanism thereof, without being limited to theory, it is conjectured that when the anion exchanger is contained, the stability of a cation ion in a nonaqueous electrolyte that diffuses from the cation exchanger to the nonaqueous electrolyte improves, and deposition of the ions is suppressed in the vicinity of the cation exchanger, resulting in inhibiting deterioration of ion exchange capability of the cation exchanger.

There is no particular restriction on the anion exchanger, and examples thereof include a layered double hydroxide (Mg—Al type, Mg—Fe type, Ni—Fe type, Li—Al type), a layered double hydroxide-alumina silica gel composite, boehmite, alumina, zinc oxide, lead oxide, iron oxide, iron oxyhydroxide, hematite, lanthanum oxide, bismuth oxide, tin oxide, titanium oxide, cerium oxide, zirconium oxide, basic copper acetate and basic zinc sulfide, etc. From the viewpoint of comparatively low content of moisture and prevention of battery swelling, as the anion exchanger, boehmite, alumina, zinc oxide, lead oxide, iron oxide, iron oxyhydroxide, hematite, lanthanum oxide, bismuth oxide, tin oxide, titanium oxide, cerium oxide, zirconium oxide, are preferable. The anion exchanger may be used singly, or two or more thereof may be used in combination.

The inorganic particles for a nonaqueous electrolyte battery of the present embodiment may contain other inorganic particles other than the cation exchanger of a one-dimensional tunnel-like crystal structure and the inorganic particles for mixing having an average thickness thicker than that of the aforementioned cation exchanger.

(Other Characteristics of Inorganic Particle for Nonaqueous Electrolyte Battery)

The BET specific surface area of the cation exchanger is preferably 3 m$^2$/g or more and more preferably 5 m$^2$/g or more. When the BET specific surface area is 3 m$^2$/g or more, life characteristics and safety of a nonaqueous electrolyte battery may be further improved. The BET specific surface area of the cation exchanger is preferably 2,000 m$^2$/g or less, more preferably 1,000 m$^2$/g or less, furthermore preferably 100 m$^2$/g or less, and still more preferably 50 m$^2$/g or less. When the BET specific surface area is 2000 m$^2$/g or less, aggregation of the inorganic particles is suppressed and an energy density of a nonaqueous electrolyte battery tends to increase.

When 0.035 parts by weight of the inorganic particles for a nonaqueous electrolyte battery is immersed in 100 parts by weight of a mixed solution of 5 ppm of Mn$^{2+}$ ions, 1 mol/L of LiPF$_6$ and a cyclic and/or a linear carbonate at 23° C. for 6 hours, an adsorption ratio of Mn$^{2+}$ ions to the inorganic particles is preferably 10% or more, more preferably 15% or more, and still more preferably 20% or more, When the adsorption ratio of Mn$^{2+}$ ions to the inorganic particles is 10% or more, life characteristics and safety of a nonaqueous electrolyte battery can be further improved.

An average secondary particle diameter (D50) of the organic particle for a nonaqueous electrolyte battery, is preferably 0.05 μm to 4 μm, more preferably 0.1 μm to 3.5 μm, and still more preferably 0.2 μm to 3 μm. Adjusting the average secondary particle diameter from 0.05 μm to 4 μm, the energy density of a nonaqueous electrolyte battery tends to be increased.

A method of controlling the average secondary particle diameter of the inorganic particles for a nonaqueous electrolyte battery in the range of 0.05 μm to 4.0 μm, is not particularly restricted, and examples thereof may include conventionally and publicly known methods such as an axial flow milling method, annular milling method, roller milling method, ball milling method, beads milling method, jet milling method, a rotary container type compression and shear milling method, a pulverizing method in a porcelain mortar, etc.

The shape of the inorganic particles for a nonaqueous electrolyte battery according to the present embodiment may be spherical, plate-like, acicular, etc., and preferably plate-like or acicular. An aspect ratio is not particularly limited.

As for the amount of the inorganic particles for mixing and the cation exchanger contained in the inorganic particles for a nonaqueous electrolyte battery, based on 100% by weight of the total weight of the inorganic particles for mixing and the cation exchanger, the content of the cation exchanger is preferably less than 50% by weight, and more preferably 40% or less. The content of the cation exchanger is preferably 1% or more, more preferably 5% or more, and still more preferably 10% or more, based on 100% by weight of the inorganic particles for mixing and the cation exchanger. If the cation exchanger content is less than 50% by weight, the energy density of a nonaqueous electrolyte battery is maintained high, and an adsorption ratio of metal ions tends to be superior. In particular, when a non-spherical, for example, an acicular cation exchanger, such as hydroxyapatite, is used, the effect of rendering the cation exchanger less than 50% by weight becomes more prominent.

<Separator for Nonaqueous Electrolyte Battery>

A separator for a nonaqueous electrolyte battery (hereinafter simply referred to as "separator") is not restricted if it has a high ion permeability and a function to isolate electrically a positive electrode and a negative electrode. A publicly known separator used for a nonaqueous electrolyte battery may be used.

There is no particular restriction on the separator and examples of the separator include a material that is stable for a nonaqueous electrolyte in a battery and also stable electrochemically such as for example polyolefin, such as for example, polyethylene (PE) and polypropylene (PP)); polyester; polyimide; polyamide; and polyurethane. A form of the separator is not particularly restricted, and a microporous membrane and a nonwoven fabric can be used.

It is preferable that the separator has a property of closing the pores (i.e., a shutdown function) at 80° C. or higher and 180° C. or lower and more preferably 100° C. or higher and 150° C. or lower. Therefore, as for the separator, it is more preferable to use a microporous membrane, or a nonwoven fabric containing polyolefin having a melting temperature that is measured with a differential scanning calorimeter (DSC) according to the stipulations of JIS K 7121, preferably at 80° C. or higher and 180° C. or lower and more preferably of 100° C. or higher and 150° C. or lower.

The microporous membrane or the nonwoven fabric to be used as the separator may be constituted solely with PE, or solely of PP, or may include two or more kinds of the materials. Further, the separator may be a laminate of a microporous membrane constituted by PE and a microporous membrane constituted by PP, for example, a three-layer laminate in which PP, PE and, PP are laminated in this order.

As the microporous membrane, for example, an ion-permeable porous membrane having many pores formed by a conventionally known solvent extraction method, a dry or wet stretching method, etc. may be used and it may be a microporous membrane used widely as a separator for a nonaqueous electrolyte battery.

The separator for a nonaqueous electrolyte battery may contain the inorganic particles for a nonaqueous electrolyte battery of the present embodiment. In the case where the separator contains the inorganic particles of the present embodiment, (i) the inorganic particles may be contained in a microporous membrane or a nonwoven fabric as a base material, or (ii) the inorganic particles of the present embodiment may be contained at least one side of the base material and for example, an inorganic particle-containing porous layer containing the inorganic particles may be placed on one side or both sides of the microporous membrane or nonwoven fabric (hereinafter referred to as "separator having an inorganic particle-containing layer").

In a case of the separator having an inorganic particle-containing layer, the microporous membrane or nonwoven fabric constitutes a layer having a principal function of a separator that transmits ions while preventing a short circuit between a positive electrode and a negative electrode, and the inorganic particle-containing layer plays a role in adsorbing metal ions dissolved from a positive electrode active material into a nonaqueous electrolyte. From this viewpoint, the separator for a nonaqueous electrolyte battery preferably has the inorganic particle-containing layer at least on one side of the base material and preferably on the side facing the positive electrode.

Further, in the separator having the inorganic particle-containing layer, in order to secure the shutdown function, the separator preferably has a microporous membrane or a nonwoven fabric as the base material, mainly composed of polyolefin having the above melting temperature, and more preferably has a microporous membrane mainly composed of polyolefin having the above melting temperature. In other words, it is particularly preferable that the separator having the inorganic particle-containing layer has the inorganic particle-containing layer on at least one side of the polyolefin having the above melting temperature as the base material.

In the separator having the inorganic particle-containing layer, a microporous membrane or a nonwoven fabric serving as a base material, and the inorganic particle-containing layer may be one body, or each may be an independent membrane, such that they may be combined together in the battery to constitute a separator.

In the present description, a porous layer "mainly composed of" polyolefin means a layer that has a content of polyolefin of 30% by volume or more in the total volume of the constituent components (total volume excluding pores), and preferably has a content of 70% by volume or more.

A porous layer mainly composed of polyolefin, particularly a microporous membrane thereof is apt to shrink thermally at elevated temperatures in a battery. However, since the inorganic particle-containing layer containing the inorganic particles for a nonaqueous electrolyte battery is difficult to shrink and functions as a heat-resistant layer, and the thermal shrinkage of the entire separator is suppressed, thereby a nonaqueous electrolyte battery excellent in safety at further elevated temperatures can be obtained.

When using a separator having an inorganic particle-containing layer, since the inorganic particle-containing layer binds inorganic particles for a nonaqueous electrolyte battery with each other, and/or binds the inorganic particle-containing layer and a base material (a nonwoven fabric or a microporous membrane), a binder is preferably included.

A binder in the inorganic particle-containing layer is not restricted, however, is preferably, for example, a binder insoluble or poorly soluble for a nonaqueous electrolyte used and stable electrochemically. Examples of such binder include, but not restricted thereto, polyolefins, such as polyethylene, polypropylene, etc.; fluorine-containing resins, such as vinylidene fluoride, tetrafluoroethylene, etc., fluorine-containing rubbers, such as a vinylidene fluoride-hexafluoropropylene-tetrafluoroethylene copolymer, an ethylene-trafluoroethylene copolymer, etc.; rubbers, such as a styrene-butadiene copolymer and hydride thereof, an acrylonitrile-butadiene copolymer and hydride thereof, an acrylonitrile-butadiene-styrene copolymer and hydride thereof, a methacrylic acid ester-acrylic acid ester copolymer, a styrene-acrylic acid ester copolymer, an acrylonitrile-acrylic acid ester copolymer, ethylene propylene rubber, polyvinyl alcohol, polyvinyl acetate, etc.; cellulose derivatives, such as ethyl cellulose, methyl cellulose, hydroxyethyl cellulose, carboxymethyl cellulose, etc.; resins having a melting point and/or glass transition temperature of 180° C. or higher, such as polyphenylene ether, polysulfone, polyether sulfone, polyphenyl sulfone, polyphenylene sulfide, polyetherimide, polyamide imide, polyester, etc.

There is no particular restriction on the binder, but, for example, at least one selected from the group consisting of particles of a non-conductive polymer or a polymer having a core-shell structure.

The particles of the non-conductive polymer or the polymer having a core-shell structure include resins that are roughly classified into the following (b1) to (b4):
(b1) Nitrile resin
(b2) Acrylic resin
(b3) Aliphatic conjugated diene resin
(b4) Resin different from (b1) to (b3)
(b1) Nitrile Resin The nitrile resin is a resin containing a polymerization unit having a nitrile group as a main component. In the present specification, containing the polymerization unit as a main component means that it is 50% by mole or more with respect to the total mole of all the monomers charged at the time of polymerization. The nitrile resin may contain, optionally, in addition to a polymerization unit having a nitrile group, at least one selected from the group consisting of an ethylenically unsaturated compound, a linear alkylene polymerization unit having 4 or more carbon atoms, a polymerization unit having a hydrophilic group, a polymerization unit having a reactive group, a vinyl polymer unit, and a polymer unit having a thermally crosslinkable group.

Examples of the thermally crosslinkable group include an epoxy group, a N-methylolamide group, an oxazoline group, an allyl group, etc. In a case of having a thermally crosslinkable group, the amount of the monomer unit having the thermally crosslinkable group in the nitrile resin is preferably 0.01 parts by weight or more and 4 parts by weight or less with respect to the total amount, 100 parts by weight of (meth)acrylonitrile monomer units and (meth)acrylic acid ester monomer units.

The iodine value of the nitrile resin is preferably 3 to 60 mg/100 mg, more preferably 3 to 30 mg/100 mg, and still more preferably 3 to 10 mg/100 mg.

The nitrile resin can be obtained by polymerization of a monomer having a nitrile group, or by copolymerization of a monomer having a nitrile group and another monomer. The monomer having a nitrile group is, for example, (meth) acrylonitrile, etc. The (meth)acrylonitrile means acrylonitrile or methacrylonitrile.

Such other monomer includes ethylenically unsaturated compounds, for example, (meth)acrylic acid, such as 2-methacrylic acid, 2-pentenoic acid, 2,3-dimethylacrylic acid, 3,3-dimethylacrylic acid, itaconic acid, these alkali metal salts, etc. (Meth)acrylic acid ester means acrylic acid ester or methacrylic acid ester, and in a (meth)acrylic acid ester monomer, a part or all of hydrogens of the alkyl group can be a haloalkyl group substituted by a halogen group, such as fluorine, etc. The number of carbon atoms bonded to a non-carbonyl oxygen atom of the (meth)acrylic acid alkyl ester is preferably 1 to 14, and more preferably 1 to 5.

Examples of (meth)acrylic acid alkyl ester having 1 to 5 carbon atoms in the alkyl group bonded to a non-carbonyl oxygen atom include acrylic acid alkyl esters, such as methyl acrylate, ethyl acrylate, n-propyl acrylate, isopropyl acrylate, n-butyl acrylate, t-butyl acrylate, hexyl (meth) acrylate, 2-ethylhexyl (meth)acrylate, etc.; and carboxylic acid esters having two or more carbon-carbon double bonds, such as ethylene glycol dimethacrylate, diethylene glycol dimethacrylate, and trimethylolpropane triacrylate, etc.

Other (meth)acrylic acid alkyl ester includes acrylic acid alkyl esters having 6 to 18 carbon atoms of an alkyl group bonded to a non-carbonyl oxygen atom, such as n-hexyl acrylate, 2-ethylhexyl acrylate, nonyl acrylate, lauryl acrylate, stearyl acrylate, cyclohexyl acrylate, isobornyl acrylate, etc.; methacrylic acid alkyl esters having 6 to 18 carbon atoms of an alkyl group bonded to a non-carbonyl oxygen atom, such as n-hexyl methacrylate, 2-ethylhexyl methacrylate, octyl methacrylate, isodecyl methacrylate, lauryl methacrylate, tridecyl methacrylate, stearyl methacrylate, cyclohexyl methacrylate, etc.; 2-(perfluoroalkyl)ethyl acylates having 6 to 18 carbon atoms of an alkyl group bonded to a non-carbonyl oxygen atom, such as 2-(perfluorohexyl)ethyl acrylate, 2-(perfluorooctyl)ethyl acrylate, 2-(perfluorononyl)ethyl acrylate, 2-(perfluorodecyl)ethyl acrylate, 2-(perfluorododecyl)ethyl acrylate, 2-(perfluorotetradecyl) ethyl acrylate, 2-(perfluorohexadecyl)ethyl acrylate, etc.; 2-(perfluoroalkyl)ethyl methacrylates having 6 to 18 carbon atoms of an alkyl group bonded to a non-carbonyl oxygen atom, such as 2-(perfluorohexyl)ethyl methacrylate, 2-(perfluorooctyl)ethyl methacrylate, 2-(perfluorononyl)ethyl methacrylate, 2-(perfluorodecyl)ethyl methacrylate, 2-(perfluorododecyl)ethyl methacrylate, 2-(perfluorotetradecyl) ethyl methacrylate, 2-(perfluorohexadecyl)ethyl methacrylate, etc.

The polymerization unit of linear alkylene having 4 or more carbon atoms is, for example, butadiene, isoprene, pentadiene, etc.

A hydrophilic group means a functional group which liberates a proton in an aqueous solvent and a salt in which the proton is substituted by a cation, and specifically includes a carboxylic acid group, a sulfonic acid group, a hydroxyl group, a phosphoric acid group, salts thereof, etc. The content ratio of the aforementioned hydrophilic group is preferably in the range of 0.05 to 10% by weight.

The introduction of the hydrophilic group into the nitrile resin is carried out by polymerizing a monomer containing a carboxylic acid group, a sulfonic acid group, a hydroxyl group, a phosphoric acid group and metal salts or ammonium salts thereof.

Examples of a monomer having a carboxylic acid group include monocarboxylic acid and derivatives thereof, dicarboxylic acid and derivatives thereof. Examples of monocarboxylic acid include acrylic acid, methacrylic acid, 3-butenoic acid, and crotonic acid. Examples of a monocarboxylic acid derivative include 2-ethyl acrylic acid, isocrotonic acid, α-acetoxy acrylic acid, β-trans-aryloxy acrylic acid, α-chloro-β-E-methoxy acrylic acid, β-diamino acrylic acid, trans-butenedioic acid, cis-butenedioic acid, etc. Examples of dicarboxylic acid include maleic acid, fumaric acid and itaconic acid. Examples of a dicarboxylic acid derivative include methylmaleic acid, dimethylmaleic acid, phenylmaleic acid, chloromaleic acid, dichloromaleic acid, fluoromaleic acid, etc. and further, maleic esters, such as methylallyl maleate, diphenyl maleate, nonyl maleate, decyl maleate, dodecyl maleate, octadecyl maleate, fluoroalkyl maleate, etc. Moreover, acid anhydride which produces a carboxyl group by hydrolysis can also be used. As acid anhydride of dicarboxylic acid, maleic anhydride, acrylic anhydride, methyl maleic anhydride, dimethyl maleic anhydride, etc. are included.

As a monomer having a sulfonic acid group, vinyl sulfonic acid, methyl vinyl sulfonic acid, (meth)allyl sulfonic acid, styrene sulfonic acid, 2-sulfoethyl (meth)acrylate, 2-acrylamide-2-methylpropane sulfonic acid and 3-allyloxy-2-hydroxypropane sulfonic acid, are included.

A monomer having a hydroxyl group includes ethylenically unsaturated alcohols, such as (meth)allyl alcohol, 3-buten-1-ol, and 5-hexen-1-ol; alkanol esters of ethylenically unsaturated carboxylic acid, such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of a polyalkylene glycol represented by the general formula: $CH_2=CR_1-COO-((CH_2)_nO)_m-H$ (m is an integer of 2 to 9, n is an integer of 2 to 4, R1 is hydrogen or a methyl group), with (meth)acrylic acid; mono (meth)acrylic acid esters of dihydroxy esters of dicarboxylic acid, such as 2-hydroxyethyl-2'-(meth)acryloyloxy phthalate, 2-hydroxyethyl-2'-(meth)acryloyloxy succinate, etc.; vinyl ethers, such as 2-hydroxyethyl vinyl ether, 2-hydroxypropyl vinyl ether, etc.; mono (meth)allyl ethers of alkylene glycol, such as (meth)allyl-2-hydroxyethyl ether, (meth) allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, (meth) allyl-6-hydroxyhexyl ether, etc.; polyoxyalkylene glycol mono (meth)allyl ethers and glycerin mono (meth)allyl ethers, such as diethylene glycol mono (meth)allyl ether and dipropylene glycol mono (meth)allyl ether; mono (meth) allyl ethers of a halogen and hydroxy-substituted compound of (poly)alkylene glycol, such as (meth)allyl-2-chloro-3-hydroxypropyl ether, (meth)allyl-2-hydroxy-3-chloropropyl ether, etc.; mono (meth)allyl ethers of polyphenol and halogen-substituted compounds thereof, such as eugenol and isoeugenol, etc.; (meth)allyl thioethers of alkylene glycol, such as (meth)allyl-2-hydroxyethyl thioether, (meth) allyl-2-hydroxypropyl thioether, etc.

Examples of a monomer having a phosphoric acid group include 2-(meth)acryloxyethyl phosphate, 2-(meth)acryloxyethyl methyl phosphate, 2-(meth)acryloxyethyl ethyl phosphate, etc.

The polymerization unit having a reactive group may be introduced for the reactivity with a surface functional group of the inorganic particles, and for the improvement of the dispersibility of the inorganic particles in a case of producing a slurry. As for the polymerization unit having a reactive group, when a surface functional group of the inorganic particles is an amino group, a reactive group of a nitrile resin is preferably an epoxy group, a carbonyl group, and a carboxyl group, and the epoxy group is more preferable.

Moreover, when a surface functional group of the aforementioned inorganic particle is an epoxy group, the reactive group of the nitrite resin is preferably a sulfonic acid group, an amino group, a phosphoric acid group, a hydroxyl group, a mercapto group, and an isocyanate group, and the sulfonic acid group and the amino group is more preferable.

Furthermore, when a surface functional group of the aforementioned inorganic particle is a mercapto group, a reactive group of the nitrite resin is preferably an epoxy group and a mercapto group.

In addition, when a surface functional group of the inorganic particles is an isocyanate group, a reactive group of the nitrile resin is preferably an epoxy group and a hydroxyl group.

Additionally, when a surface functional group of the inorganic particles is a hydroxyl group or a carboxyl group, a carbodiimide group, an epoxy group, an oxazoline group, a hydrazide group, and an isocyanato group are preferable.

Furthermore, the nitrile resin may contain an arbitrary another repeating unit, in addition to the repeating units described above (i.e., (meth)acrylonitrile monomer units, (meth)acrylic acid ester monomer units and monomer units having a thermally crosslinkable group). Examples of monomers corresponding to the aforementioned arbitrary repeating units include styrene-based monomers, such as styrene, chlorostyrene, vinyltoluene, t-butylstyrene, vinylbenzoic acid, methyl vinylbenzoate, vinylnaphthalene, chloromethylstyrene, α-methylstyrene, divinylbenzene, etc.; olefins, such as ethylene and propylene; halogen-containing monomers, such as vinyl chloride, vinylidene chloride, etc.; vinyl esters, such as vinyl acetate, vinyl propionate, vinyl butyrate, etc.; vinyl ethers, such as methyl vinyl ether, ethyl vinyl ether, butyl vinyl ether, etc.; vinyl ketones, such as methyl vinyl ketone, ethyl vinyl ketone, butyl vinyl ketone, hexyl vinyl ketone, isopropenyl vinyl ketone, etc.; heterocyclic ring-containing vinyl compounds, such as N-vinyl pyrrolidone, vinyl pyridine, and vinylimidazole, etc.; amide-based monomers, such as acrylamide, etc.; sulfonic acid esters, such as acrylamido-2-methylpropane sulfonic acid, etc.; an imino compound, maleimide, an unsaturated polyalkylene glycol ether-based monomer, an ethylene functional silicon-containing monomer, a chelate compound, isothiazolines, siloxanes, sulfosuccinic acid ester and salts thereof, etc. The nitrile resin may contain only one kind of the aforementioned arbitrary repeating unit, or may contain two or more kinds combined in an arbitrary ratio. However, from the viewpoint of remarkably exhibiting the advantage of including the (meth)acrylonitrile monomer unit and the (meth)acrylate monomer unit as described above, it is preferable to contain a small amount of the aforementioned arbitrary repeating units, and particularly preferable not to contain any of the above repeating units.

The weight-average molecular weight of the nitrile resin is preferably 10,000 or more, more preferably 20,000 or more, preferably 2,000,000 or less, and more preferably 50,000 or less. When the weight-average molecular weight of the nitrile resin falls within the above range, the strength of the porous film and the dispersibility of the non-conductive polymer of the present invention can be easily improved.

The volume-average particle diameter D50 of the nitrile resin is preferably 0.01 µm or more, preferably 0.5 µm or less, and furthermore preferably 0.2 µm or less. When the volume-average particle diameter D50 of the nitrile resin is equivalent to or more than the lower limit of the above range, the porosity of the porous film of the present invention is maintained high to suppress the resistance of the porous film, and thereby the battery physical properties are favorably maintained. In addition, by setting it below the upper limit of the above range, the binding property can be enhanced due to increase in bonding points between a non-conductive particle and a nonaqueous particulate polymer.

The glass transition temperature (Tg) of the nitrile resin is preferably 20° C. or lower, more preferably 15° C. or lower, and particularly preferably 5° C. or lower. When the glass transition temperature (Tg) falls within the above range, the flexibility of the porous film of the present invention is enhanced, and the bending resistance of an electrode and a separator is improved, so that the defect rate due to rupture of the porous film of the present invention is reduced. In addition, cracks or chips of the porous film, the separator and the electrode of the present invention when wounded on a roll or wound, can be avoided. It is noted here that the glass transition temperature of the nonaqueous particulate polymer can be adjusted by combining various monomers. The lower limit of the glass transition temperature of the nitrile resin is not particularly restricted, but can be −50° C. or higher.

In the process of producing the nitrile resin, a dispersant used in the polymerization method may be one used in ordinary synthesis, and specific examples include benzenesulfonates, such as sodium dodecylbenzene sulfonate, sodium dodecyl phenyl ether sulfonate, etc.; alkyl sulfates, such as sodium lauryl sulfate, sodium tetradodecyl sulfate, etc.; sulfosuccinates, such as sodium dioctyl sulfosuccinate, sodium dihexyl sulfosuccinate, etc.; fatty acid salts, such as sodium laurate etc.; ethoxy sulfates, such as polyoxyethylenelauryl ether sodium sulfate, polyoxyethylene nonylphenyl ether sodium sulfate, etc.; an alkane sulfonate; an alkyl ether sodium phosphate; nonionic emulsifiers, such as polyoxyethylene nonylphenyl ether, polyoxyethylene sorbitan lauryl acid ester, a polyoxyethylene-polyoxypropylene block copolymer, etc.; aqueous polymers, such as gelatin, a maleic anhydride-styrene copolymer, polyvinyl pyrrolidone, sodium polyacrylate, polyvinyl alcohol having a polymerization degree of 700 or more and a saponification degree of 75% or more, etc., and these may be used singly or in combination of two or more. Among these, benzene sulfonates, such as sodium dodecylbenzenesulfonate, sodium dodecyl phenyl ether sulfonate; and alkyl sulfates, such as sodium lauryl sulfate, sodium tetradodecyl sulfate, etc. are preferable, and benzene sulfonates, such as sodium dodecylbenzenesulfonate and sodium dodecyl phenyl ether sulfonate are more preferable from the viewpoint of resistance to oxidation. The amount of the dispersant added can arbitrarily be set, and is usually about 0.01 to 10 parts by weight with respect to 100 parts by weight of the total amount of monomers.

A pH of the nitrile resin dispersed in the dispersion medium is preferably 5 to 13, more preferably 5 to 12, and most preferably 10 to 12. When the pH of the nitrile resin is in the above range, the storage stability of the nitrile resin is improved, and the mechanical stability is further enhanced.

A PH modifier for adjusting the pH of nitrile resins includes alkali metal hydroxides, such as lithium hydroxide, sodium hydroxide, potassium hydroxide, etc., alkaline earth metal oxides, such as magnesium hydroxide, calcium hydroxide, barium hydroxide, etc. of a group 2 element oxide, hydroxides, such as hydroxides of a metal belonging to elements of groups IIIa in the long periodical table, such as aluminum hydroxide etc.; alkali metal carbonates, such as sodium carbonate, potassium carbonate, etc., carbonates such as group 2 element carbonates, such as magnesium carbonate, etc.; and examples of such organic amine include alkylamines, such as ethylamine, diethylamine and propylamine; alcohol amines, such as monomethanol amine, monoethanol amine, monopropanol amine, etc.; ammonias, such as ammonia water. Among these, alkali metal hydroxide is preferable from the viewpoint of binding property and handleability, and sodium hydroxide, potassium hydroxide and lithium hydroxide are particularly preferable.

The nitrile resin may contain a crosslinking agent. Examples of the crosslinking agent include a carbodiimide compound, a polyfunctional epoxy compound, an oxazoline compound, a polyfunctional hydrazide compound, an isocyanate compound, a melamine compound, a urea compound, and a mixture thereof.

Specific examples of the nitrile resin include polyacrylonitrile, an acrylonitrile-butadiene copolymer, an acrylonitrile-styrene copolymer, an acrylonitrile-butadiene-styrene copolymer, an acrylonitrile-styrene-acrylate copolymer, or these hydrogenated products.

(b2) Acrylic Resin

An acrylic resin is a resin obtained by using an acrylic compound as a main monomer. Using it as a main monomer means that it is 50% by mole or more with respect to the total moles of all the monomers charged at the time of polymerization. The acrylic compound is a monomer having a (meth)acryloyl group which is an acryloyl group or a methacryloyl group.

The acrylic resin is, optionally, in addition to a polymerization unit having an acryloyl group, may contain at least one selected from the group consisting of an ethylenically unsaturated compound containing (meth)acrylonitrile, a linear alkylene polymerization unit having 4 or more carbon atoms, a polymerization unit having a hydrophilic group, a polymerization unit having a reactive group, an aromatic vinyl polymer unit, and a polymerization unit having a thermally crosslinkable group. Examples of the thermally crosslinkable group include an epoxy group, an N-methylolamide group, an oxazoline group, an allyl group, etc. When having the thermally crosslinkable group, the amount of the monomer unit having the thermally crosslinkable group in the acrylic resin is 0.01 parts by weight or more and 4 parts by weight or less with respect to the 100 parts by weight of the total amount of a (meth)acrylonitrile monomer unit and an (meth)acrylic acid ester monomer unit.

The acrylic resin can be obtained by polymerizing an acryl compound, or by copolymerizing an acryl compound with another monomer.

As the acrylic compound, the following monomers may be used:

As an example of (meth) acrylic acid, for example, acrylic acid, 2-methacrylic acid, 2-pentenoic acid, 2, 3-dimethyl acrylic acid, 3, 3-dimethyl acrylic acid, itaconic acid, these alkali metal salts, etc., are included.

Examples of (meth)acrylic acid ester include (meth) acrylic acid alkyl esters, such as methyl (meth)acrylate, ethyl (meth)acrylate, n-propyl acrylate, isopropyl acrylate, n-butyl (meth)acrylate, t-butyl acrylate, hexyl (meth)acrylate, 2-ethylhexyl (meth)acrylate, etc.; diacrylate compounds having two or more carbon-carbon double bonds, such as ethylene glycol dimethacrylate, diethylene glycol dimethacrylate, trimethylolpropane triacrylate, etc.; a triacrylate compound, a tetraacrylate compound, a dimethacrylate compound, a trimethacrylate compound, etc. In addition, fluorine-containing acrylic acid ester, amide group-containing (meth)acrylic acid or amide group-containing (meth)acrylate; a (meth)acrylic functional silicon-containing monomer, etc., are also included.

Other monomer includes, in addition to an ethylenically unsaturated compound, such as (meth)acrylonitrile, as (meth)acrylic acid alkyl ester, alkyl acrylates, such as methyl acrylate, ethyl acrylate, n-propyl acrylate, isopropyl acrylate, n-butyl acrylate, t-butyl acrylate, hexyl (meth)acrylate, 2-ethylhexyl (meth)acrylate, etc.; and carboxylic acid esters having two or more carbon-carbon double bonds, such as ethylene glycol dimethacrylate, diethylene glycol dimethacrylate, trimethylolpropane triacrylate, etc.

Other (meth)acrylic acid alkyl ester includes alkyl acrylates having 6 to 18 carbon atoms of an alkyl group bonded to a non-carbonyl oxygen atom, such as n-hexyl acrylate, 2-ethylhexyl acrylate, nonyl acrylate, lauryl acrylate, stearyl acrylate, cyclohexyl acrylate, isobornyl acrylate, etc.; alkyl methacrylates having 6 to 18 carbon atoms of an alkyl group bonded to a non-carbonyl oxygen atom, such as n-hexyl methacrylate, 2-ethylhexyl methacrylate, octyl methacrylate, isodecyl methacrylate, lauryl methacrylate, tridecyl methacrylate, stearyl methacrylate, cyclohexyl methacrylate, etc.; 2-(perfluoroalkyl) acrylates having 6 to 18 carbon atoms of an alkyl group bonded to a non-carbonyl oxygen atom, such as 2-(perfluorohexyl)ethyl acrylate, 2-(perfluorooctyl) ethyl acrylate, 2-(perfluorononyl) acrylate, 2-(perfluorodecyl)ethyl acrylate, 2-(perfluorododecyl)ethyl acrylate, 2-(perfluorotetradecyl)ethyl acrylate, 2-(perfluorohexadecyl)ethyl acrylate, etc.; 2-(perfluoroalkyl) methacrylates having 6 to 18 carbon atoms of an alkyl group bonded to a non-carbonyl oxygen atom, such as 2-(perfluorohexyl)ethyl methacrylate, 2-(perfluorooctyl) ethyl methacrylate, 2-(perfluorononyl)ethyl methacrylate, 2-(perfluorodecyl)ethyl methacrylate, 2-(perfluorododecyl) ethyl methacrylate, 2-perfluorotetradecyl)ethyl methacrylate, 2-(perfluorohexadecyl) ethyl methacrylate, etc.

Furthermore, the acrylic resin may contain another arbitrary repeating unit, other than the aforementioned repeating monomer units (i.e., (meth)acrylic monomer units, (meth)acrylonitrile monomer units, (meth)acrylic acid ester monomer units, and monomer units having a thermally crosslinkable group). Examples of the monomer unit corresponding to the aforementioned arbitrary repeating monomer units include a linear allylene polymerization unit having 4 or more of carbon atoms, a monomer having a carboxylic acid group, a monomer having a sulfonic acid group, a monomer having a hydroxyl group, a monomer having a phosphoric acid group, a reactive polymerization unit, styrene-based monomer units, such as styrene, chlorostyrene, vinyl toluene, t-butylstyrene, vinyl benzoic acid, methyl vinyl benzoate, vinyl naphthalene, chloromethyl styrene, α-methyl styrene, divinyl benzene, etc.; olefins, such as ethylene, propylene, etc.; halogen atom-containing monomers, such as vinyl chloride, vinylidene chloride, etc.; vinyl esters, such as vinyl acetate, vinyl propionate, vinyl butyrate, etc.; vinyl ethers, such as methyl vinyl ether, ethyl vinyl ether, butyl vinyl ether, etc.; vinyl ketones, such as methyl vinyl ketone, ethyl vinyl ketone, butyl vinyl ketone, hexyl vinyl ketone, isopropenyl vinyl ketone, etc.; heterocyclic ring-containing vinyl compounds, such as N-vinyl pyrrolidone, vinyl pyridine, vinyl imidazole, etc.; amide-based monomers, such as acrylamide, etc., sulfonic acid esters, such as acrylamido-2-methylpropane sulfonic acid, etc.; an imino compound, maleimide, an unsaturated polyalkylene glycol ether monomer, an ethylene functional silicon-containing monomer, a chelate compound, isothiazolines, siloxanes, sulfosuccinic acid ester and salts thereof, etc. The acrylic resin may contain only one kind of the aforementioned arbitrary repeating units or may contain two or more kinds combined in an arbitrary ratio. However, from the viewpoint of remarkably exhibiting the advantage of including the (meth) acrylonitrile monomer unit and the (meth)acrylate monomer unit as described above, it is preferable to contain a less amount of the aforementioned arbitrary repeating units, and particularly preferable not to contain any of the above repeating units.

The weight-average molecular weight of the acrylic resin is preferably 10,000 or more, more preferably 20,000 or more, preferably 2,000,000 or less, and more preferably 500,000 or less. When the weight-average molecular weight of the acrylic resin falls within the above range, the strength of the porous film of the present invention and the dispersibility of the non-conductive polymer can be easily improved.

The volume-average particle diameter D50 of the acrylic resin is preferably 0.01 μm or more, preferably 0.5 μm or less, and furthermore preferably 0.2 µm or less. When the volume-average particle diameter D50 of the acrylic resin is equivalent to or more than the lower limit of the above range, the porosity of the porous film of the present invention is maintained high to suppress the resistance of the porous film, and thereby the battery physical properties are favorably maintained. In addition, by setting it below the upper limit of the above range, the binding property can be enhanced due to increase in bonding points between a non-conductive particle and a nonaqueous particulate polymer.

The glass transition temperature (Tg) of the acrylic resin is preferably 20° C. or lower, more preferably 15° C. or lower, and particularly preferably 5° C. or lower. When the glass transition temperature (Tg) falls within the above range, the flexibility of the porous film of the present invention is enhanced, the bending resistance of an electrode and a separator is improved, and the defect rate due to rupture of the porous film of the present invention is reduced. In addition, cracks or chips of the porous film, the separator and the electrode of the present invention when wounded on a roll or wound, can be avoided. It is noted here that the glass transition temperature of the nonaqueous particulate polymer can be adjusted by combining various monomers. The lower limit of the glass transition temperature of the acrylic resin is not particularly restricted, but can be −50° C. or higher.

In the production process of the acrylic resin, the dispersant used in the polymerization method may be one used in ordinary synthesis.

The pH of the acrylic resin dispersed in the dispersion medium is preferably 5 to 13, more preferably 5 to 12, and most preferably 10 to 12. When the pH of the acrylic resin is in the above range, the storage stability of the acrylic resin is improved, and the mechanical stability is further improved.

The pH of the acrylic resin may be adjusted with a pH adjuster.

The acrylic resin may contain a crosslinking agent.

Specifically, the acrylic resin is an acrylic soft polymer, an acrylic hard polymer, an acrylic-styrene copolymer, a sulfonated acrylic polymer, or these seed polymers, a hydrogenated product or a graft product.

The acrylic resin may be in the form of a non-conductive organic particle. The acrylic resin may be an aqueous resin when formed from an acrylic compound and a silicon-containing monomer. The acrylic resin may contain carboxymethylcellulose as a thickener.

(b3) Aliphatic Conjugated Diene-based Resin

The aliphatic conjugated diene-based resin is a resin obtained by using an aliphatic monomer having a conjugated diene as a main component. In the present specification, when used as a main component, it is 50% by mole or more with respect to the total moles of all the monomers charged at the time of polymerization.

The aliphatic monomer having a conjugated diene is a substituted or unsubstituted linear diene and may be linear or branched. Specifically, the aliphatic monomers having conjugated dienes are 1,3-butadiene, 1,3-isoprene, 1,4-dimethyl-1,3-butadiene, 1,2-dimethyl-1,3-butadiene, 1,3-dimethyl-1,3-butadiene, 1,2,3-trimethyl-1,3-butadiene, 1,3,5-hexatriene, alloocimene, etc.

The aliphatic conjugated diene-based resin can be obtained by polymerizing an aliphatic monomer having a conjugated diene, or copolymerizing an aliphatic monomer having a conjugated diene with another monomer.

As such other monomer, ethylenically unsaturated carboxylic acid, a sulfonic acid group-containing monomer, a nitrile group-containing monomer, an aromatic vinyl monomer, a monomer having a thermally crosslinkable group, and an aromatic vinyl compound, etc., may be used.

Specifically, the aliphatic conjugated diene-based resin may be a 1,3-butadiene polymer, a diene-based rubber, a thermoplastic elastomer, or these random copolymers, these block copolymers, and these hydrogenated or acid modified products. The aliphatic conjugated diene-based resin may optionally contain an anti-aging agent such as a combination of a phenol-based compound and a thioether-based compound or a combination of a phenol-based compound and a phosphite-based compound.

(b4) Resin Different from Resins (b1) to (b3)

The resin (b4) different from the resins (b1) to (b3) is, for example, an olefin resin, a fluorine resin, a sulfonic acid group-containing resin, a cellulose resin, etc. The resin (b4) may be in the form of particles of an organic polymer, a graft polymer, polymer latex, a silicon-containing polymer, etc.

Specifically, the olefin-based resin is an independent polymer of an olefin compound or a copolymer of the independent polymer with a copolymerizable monomer such as polyethylene, polypropylene, poly-1-butene, an ethylene•α-olefin copolymer, a propylene•α-olefin copolymer, an ethylene•propylene•diene copolymer (EPDM), ethylene•propylene styrene•copolymer, etc.

As for the fluorine resin, polytetrafluoroethylene, polyvinylidene difluoride, polychlorotrifluoroethylene, polyvinyl fluoride, tetrafluoroethylene-ethylene copolymer, a perfluoroalkoxy fluorine resin, a tetrafluoroethylene-hexafluoropropylene copolymer, an ethylene-chlorotrifluoroethylene copolymer, vinylidene fluoride rubber, a tetrafluoroethylene-propylene copolymer, etc., are included.

Examples of the sulfonic acid group-containing resin include a sulfonated polymer, such as sulfonated polyether sulfone, sulfonated polysulfone, etc.

As the cellulose resin, for example, a cellulose semisynthetic polymer, a sodium salt or ammonium salt thereof, etc., are included, for example. The cellulose-based resin may have a sulfur atom, a cationic group, an acid group, a propargyl group, etc.

Examples of the silicon-containing polymer include dimethylpolysiloxane, diphenylpolysiloxane, dihydroxypolysiloxane, etc.

A particle of a polymer having a core-shell structure has a core portion containing a polymer and a shell portion containing a polymer. Moreover, the resin having a core-shell structure preferably has a segment compatible with a nonaqueous electrolyte and a segment not compatible with it. As the polymer of the core portion or shell portion, the resins (b1) to (b4) described above can be used.

The particles of a polymer having a core-shell structure can be polymerized, for example, using a monomer of the polymer forming the core portion and a monomer of the polymer forming the shell portion, and changing stepwise a ratio of these monomers with the duration of time. Specifically, first, the monomers of the polymer forming the core portion are polymerized to produce seed polymer particles. The seed polymer particles form a core consisted of the particles. Subsequently, in the polymerization system containing the seed polymer particles, the monomers of the polymer forming the shell portion are polymerized. Then the particle of the polymer having a core-shell structure is obtained by forming the shell portion on the surface of the core portion. A reaction medium, a polymerization initiator, a surfactant, etc., may be used as necessary.

(Core Portion)

The core portion of the particles generally has a softening start point or decomposition point at 175° C. or higher, preferably 220° C. or higher, and more preferably 225° C. or higher. The core portion having the softening start point or decomposition point in a temperature range of 175° C. or higher is difficult to deform under a use environment and during heat press of a secondary battery and can suppress clogging of pores of a microporous membrane. Moreover, since it can suppress reduction in the rigidity of a microporous membrane, shrinkage of a separator can also be suppressed. Therefore, it is possible to stably prevent a short circuit at an elevated temperature environment. Moreover, the upper limit of the softening start point or decomposition point of the core part is not particularly restricted, but usually 450° C. or lower.

A method for measuring the softening start point will be described below.

First, 10 mg of a sample weighed is placed on an empty aluminum pan, and the sample is subjected to thermal analysis to obtain a DSC curve under normal temperature and normal humidity, using a differential thermal analyzer with other empty aluminum pan as reference in a measurement temperature range of −100° C. to 500° C. at a rate of temperature rise of 10° C./minute. In the temperature rise process, the crossing point is a glass transition point (Tg) between a baseline just before the observed endothermic peak of the DSC curve, at which the differential signal (DDSC) becomes 0.05 mW/minute/mg or more, and a tangent of the DSC curve at the inflection point that appears first after the endothermic peak. Furthermore, a temperature higher than the glass transition point by 25° C. is taken as the softening start point.

It is noted that when the decomposition point is lower than the softening start point of the core portion of a non-conductive particle, there often occurs a case that the softening start point is not observed due to its decomposition.

A method of measuring the decomposition point will be described below.

In a nitrogen atmosphere, a sample to be measured is heated from 30° C. at a rate of temperature rise of 10° C./minute using a differential thermal-thermal weight simultaneous measurement apparatus. At this time, the temperature at which the weight loss ratio reaches 10% by weight is taken as the decomposition point.

It is noted that when both the softening start point and the decomposition point of the core portion of the particle are observed, the lower temperature is regarded as the softening start point of the core portion.

Examples of a polymer forming the core portion include highly crosslinked polymers of resins (b1) to (b4). Due to the high degree of crosslinks the molecular motion of the polymer is suppressed even at a temperature above the glass transition point of the polymer, and thereby the shape of the core can be maintained.

A polymer forming the core portion is preferably obtained by polymerizing a crosslinkable vinyl monomer. As the crosslinkable vinyl monomer, for example, a compound which has two or more of copolymerizable double bonds and preferably the two double bonds, is included. Moreover, one kind of the crosslinkable vinyl monomer may be used singly, and two or more kinds may be used in combination at an arbitrary ratio.

Examples of a suitable crosslinkable vinyl monomer include a non-conjugated divinyl compound and a polyvalent acrylate compound.

Examples of the non-conjugated divinyl compound include divinyl benzene, etc.

Examples of polyvalent acrylate include diacrylate compounds, such as polyethylene glycol diacrylate, 1,3-butylene glycol diacrylate, 1,6-hexane glycol diacrylate, neopentyl glycol diacrylate, polypropylene glycol diacrylate, 2,2'-bis(4-acryloxypropyloxyphenyl) propane, 2,2'-bis(4-acryloxydiethoxyphenyl) propane, etc.; triacrylate compounds, such as trimethylolpropane triacrylate, trimethylolethane triacrylate, tetramethylolmethane triacrylate, etc.; tetraacrylate compounds, such as tetramethylolmethane tetraacrylate, etc.; dimethacrylate compounds such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane glycol dimethacrylate, neopentyl glycol dimethacrylate, dipropylene glycol dimethacrylate, polypropylene glycol dimethacrylate, 2,2'-bis(4-methacryloxydiethoxyphenyl) propane, etc.; trimethacrylate compounds, such as trimethylolpropane trimethacrylate, trimethylolethane trimethacrylate, etc.

The proportion of the crosslinkable vinyl monomer is preferably 20% by weight or more, more preferably 25% by weight or more, and still more preferably 30% by weight or more, based on the total monomers of the polymer forming the core portion. By setting the proportion of the crosslinkable vinyl monomer to 20% by weight or more, hardness, heat resistance and solvent resistance of the core portion can be improved. Moreover, the upper limit is usually preferably 100% by weight or less, more preferably 98% by weight or less, and still more preferably 95% by weight or less. Here, the amount of the crosslinkable vinyl monomer is, for example, is that of a pure product thereof excluding diluents and impurities.

(Shell Portion)

The softening start point of the shell portion of the particles is preferably 85° C. or higher, more preferably 87° C. or higher, still more preferably 89° C. or higher, and on the other hand, preferably 145° C. or lower, more preferably 125° C. or lower, and more preferably below 115° C. When the softening start point is 85° C. or higher, the blocking resistance of a microporous membrane can be improved. In addition, since the shell portion comes to exhibit resistance to melt at the operating temperature of the secondary battery, clogging of the pores of a separator can be suppressed, whereby the rate characteristics of a secondary battery can be improved. Moreover, since the shell portion can easily melt during heat pressing due to the softening start point being 145° C. or lower, the adhesiveness of the separator is improved, and whereby the cycle characteristics of the secondary battery are improved.

As for a polymer forming the shell portion, a polymer containing a (meth)acrylate unit is preferably used. The electrical stability of a porous film can be improved by forming the shell portion with the polymer containing a (meth)acrylate unit. Examples of acrylate include methyl acrylate, ethyl acrylate, butyl acrylate, 2-ethylhexyl ethyl acrylate, etc. Examples of methacrylate include methyl methacrylate, butyl methacrylate, 2-ethylhexyl methacrylate, etc.

A ratio of the (meth)acrylate unit in the polymer forming the shell portion is preferably 50% by weight or more, more preferably 60% by weight or more, further preferably 70% by weight or more, and 100% by weight or less from the viewpoint of electrical stability.

(Particle Size of Non-Conductive Particle and Polymer Having Core-Shell Structure)

The number-average particle size of the non-conductive particle is preferably 50 nm or more, more preferably 200 nm or more, still more preferably 300 nm or more, and on the other hand, preferably 1,500 nm or less, more preferably 1,200 nm or less, and still more preferably, 500 nm or less. By setting the number-average particle size of the particles to such a range, it is possible to form a gap between particles to such an extent that the movement of ions is not inhibited while the particles have a contact portion with each other. Therefore, the strength of a microporous membrane improves, and a short circuit of a battery can be prevented, as well as the cycle characteristics of a secondary battery can be improved.

The number-average particle size of the particles can be measured as follows. 200 particles are arbitrarily selected from a photograph taken at a magnification of 25,000 using a field emission scanning electron microscope. When the longest side of the particle image is La and the shortest side is Lb, (La+Lb)/2 is a particle size. The average particle size of 200 particles is determined as the average particle size.

The thickness of the shell portion is preferably 3% or more, more preferably 5% or more, still more preferably 7% or more, and preferably 18% or less, more preferably 16% or less, and more preferably 14% or less, with respect to the number-average particle size of the particles. The adhesiveness of a separator can be improved as the thickness is 3% or more with respect to the thickness number-average particle size of the shell portion, and the cycle characteristic of a secondary battery can be improved. In addition, when the thickness of the shell portion is 18% or less with respect to the number-average particle size, the pore diameter of the separator can be increased to such an extent that the movement of ions is not hindered, thereby improving the rate characteristics of the secondary battery. Moreover, since the core portion can be relatively enlarged by thinning the shell portion, the rigidity of the particles can be enhanced. From this reason, the rigidity of the microporous membrane can be enhanced to suppress the shrinkage of the separator.

The thickness (S) of the shell portion can be calculated from, for example, the number-average particle size (D1) of a seed polymer particle before forming the shell portion and the number-average particle size (D2) of the non-conductive particle after forming the shell portion, by using the following formula:

$$(D2-D1)/2=S$$

(Amount of Non-Conductive Particle and Particle of Polymer Having Core-Shell Structure)

The content ratio of the non-conductive particle or the particle of polymer having the core-shell structure in a porous film is preferably 70% by weight or more, more preferably 75% by weight or more, still more preferably 80% by weight or more, and usually 98% by weight or less, more preferably 96% by weight or less, and more preferably 94% by weight or less. When the content ratio of the particle falls within the above range, the particles can have a contact portion with each other and form a gap between the particles to such an extent that the migration of ions is not inhibited, thereby improving a separator strength and stably preventing a short circuit.

When a separator has an inorganic particle-containing layer, the content of the inorganic particles in the inorganic particle-containing layer, with respect to the entire volume (whole volume excluding a pore portion) of the constituent components of the porous layer, is preferably 1% by volume or more, and more preferably 5% by volume or more, from the viewpoint of securing the effect of its use.

Moreover, the separator may also contain the other inorganic particles and/or resin particles other than the inorganic particles for a nonaqueous electrolyte battery of the present embodiment. By containing the other inorganic particles and/or resin particles in the separator, for example, the shape stability of the entire separator at elevated temperatures can be further enhanced.

As described above in the section "<Inorganic Particle for Nonaqueous Electrolyte Battery>", other particle different from the cation exchanger having a one-dimensional tunnel-like crystal structure and the inorganic particles for mixing having an average thickness that is thicker than that of the cation exchanger, can be used.

As for the resin particle, it has preferably heat resistance, electrical insulation, and stability for a nonaqueous electrolyte in a battery, and is composed of an electrically stable resin that has resistance to oxidation and reduction for the operating voltage range of the battery. As a resin forming such resin particles, examples thereof include at least one type of crosslinked resins, such as a styrene resin (polystyrene, etc.), a styrene butadiene rubber, an acrylic resin (polymethyl methacrylate, etc.), polyalkylene oxide (polyethylene oxide, etc.), a fluorine resin (polyvinylidene difluoride, etc.), and these derivatives; a urea resin, polyurethane, etc. The resin particle may be used singly, or two or more thereof may be used in combination. In addition, the resin particle may contain publicly known additives that can be added to the resin, for example, such as an antioxidant, etc. as necessary.

The shape of the other inorganic particles or resin particles may be, each independently, any of plate-like, scale-like, acicular, columnar, spherical, polyhedral, or massive shape, and from the viewpoint of improvement of permeability, a polyhedron shape constituted with a plurality of faces is preferable.

With regard to the particle size of the other inorganic particles or resin particles, the average particle diameter (D50) thereof are each independently, preferably 0.1 μm to 4.0 μm, more preferably 0.2 μm to 3.5 μm, and furthermore preferably, 0.4 μm to 3.0 μm. By adjusting the average particle size to 0.1 μm to 4.0 μm, thermal shrinkage of a separator at elevated temperatures tends to be further suppressed.

When a separator contains the other inorganic particles and/or resin particles, the particle may be contained in, for example, (i) a porous layer (inorganic particle-containing layer) containing the inorganic particles for a nonaqueous electrolyte battery of the present embodiment, or (ii) another porous layer (hereinafter only referred to as "other porous layer") other than the inorganic particle-containing layer and the base material.

In a case where other inorganic particles or the resin particles are contained in (i) the inorganic particle-containing layer, the content of the other inorganic particles and resin particles is preferably adjusted so that the content of the particles for a nonaqueous electrolyte battery should be within the favorable range described above.

In the case where the resin particle is contained in (ii) the other porous layer, the other porous layer may be placed, for example, on one surface side (on a side opposite to the surface on which a porous layer containing the inorganic particles for a nonaqueous electrolyte battery of the present embodiment is located) of a nonwoven fabric or a microporous membrane as a base material; may be placed between the inorganic particle-containing layer and the base material; or may be placed on a surface of the inorganic particle-containing layer, opposite to the surface in contact with the base material among the surfaces of the inorganic particle-containing layer.

Other layer containing other particle and/or the resin particle may be integrated with the base material and/or the inorganic particle-containing layer or may be present as an independent membrane that is combined with these in a battery to constitute a separator.

When the other inorganic particles and/or resin particles is added to (ii) other porous layer, the content of the other inorganic particles and resin particles in the other porous layer is preferably 5% by volume or more with respect to the total volume (total volume excluding the pore portion) of other porous layer, more preferably 10% by volume or more, and further preferably 50% by volume or more.

When the other inorganic particles and/or resin particles are added to (ii) other porous layer, it is preferable that the porous layer should contain a binder. The content of the other inorganic particle and resin particle in the other porous layer is preferably 99.5% by volume or less with respect to the total volume (total volume excluding the pore portion) of the other porous layer. As for the binder, binders listed for the porous layer containing the inorganic particles for a nonaqueous electrolyte battery of the present embodiment can be used identically.

Even when the separator for a nonaqueous electrolyte battery does not contain the porous layer containing the inorganic particles for a nonaqueous electrolyte battery according to the present embodiment, the separator may be a separator, which has the nonwoven fabric or the microporous membrane described above as a base material, and has a porous layer containing the other inorganic particles or the resin particle on one side or both sides thereof.

The porosity of the separator used for a nonaqueous electrolyte battery is preferably 30% or more in a dried state of the separator in order to secure the holding amount of a nonaqueous electrolyte, and to improve the ion permeability, and more preferably 40% or more. The porosity of the separator is preferably 80% or less in a dry state of the separator from the viewpoint of securing strength of the separator and prevention of internal short circuit, and more preferably 70% or less. In the present description, the porosity P (%) of the separator may be calculated from the thickness of the separator, the weight per area, and the density of a constituent component by summing up the values of each component i using the following equation:

$$P=[1-(m/t)/(\Sigma a_i \rho_i)] \times 100$$

{wherein, $a_i$ is the ratio of a component i with respect to the total weight as 1; $\rho_i$ is the density (g/cm$^3$) of a component i; m is the weight per unit area of the separator (g/cm$^2$); and t is the thickness (cm) of the separator}.

The total thickness of a separator is preferably from 2 µm to 200 µm, more preferably from 5 µm to 100 µm, and further preferably from 7 µm to 30 µm in both cases of having the aforementioned porous layer and of not having it. When the total thickness of the separator is 2 µm or more, the mechanical strength of the separator tends to be enhanced. Further, when the total thickness of the separator is 200 µm or less, the volume occupied by the separator in a battery is reduced, so that a nonaqueous electrolyte battery tends to have a higher capacity, and the ion permeability tends to be improved.

The air permeability of the separator for a nonaqueous electrolyte battery is preferably from 10 second/100 cc to 500 second/100 cc, more preferably from 20 second/100 cc to 450 second/100 cc, and further preferably from 30 second/100 cc to 450 second/100 cc. When the air permeability is 10 second/100 cc or more, there is a tendency that the self-discharge is reduced in using the separator for a nonaqueous electrolyte battery. Further, when the air permeability is 500 second/100 cc or less, better charge and discharge characteristics tend to be obtained.

When the separator has a porous layer containing the inorganic particles for a nonaqueous electrolyte battery of the present embodiment, the thickness of the porous layer is preferably from 1 µm to 10 µm.

When the separator has other porous layer containing the other inorganic particles or resin particles, the thickness of the porous layer is preferably from 1 µm to 10 µm.

The thickness of the base material itself of the separator, for example such as a nonwoven fabric or the porous layer itself is preferably from 5 µm to 40 µm.

The porous layer containing the inorganic particles for a nonaqueous electrolyte battery of the present embodiment may be formed through a process in which a composition (such as a paste, or a slurry) is prepared by dispersing or dissolving the inorganic particles for a nonaqueous electrolyte battery of the present embodiment, a binder, etc., in water or an organic solvent, and coated to an area where such a porous layer is to be formed, and then dried; or the composition is coated to a base material such as a resin film, etc. followed by drying, and then the coated film is peeled to form an independent film. Other porous layer containing the other inorganic particles or resin particles can also be formed in the same manner as in the above.

A porous layer containing the inorganic particles for a nonaqueous electrolyte battery of the present embodiment may further contain an aqueous polymer. As the aqueous polymer, a generally known aqueous dispersant or an aqueous thickener that is generally known as an aqueous dispersant or an aqueous thickener, can be used.

Examples of the aqueous dispersant include cationic surfactants, such as an organosiloxane polymer KP 341 (manufactured by Shinetsu Chemical Co., Ltd.), methacrylic acid or acrylic acid (co)polymer Polyflow No. 75, No. 90, No. 95 (all manufactured by Kyoeisha Chemical Co., Ltd.), W001 (Yusho Co., Ltd.), etc.; nonionic surfactants, such as polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, sorbitan fatty acid ester, etc.; anion surfactants, such as W004, W005, W017 (all manufactured by Yusho Co., Ltd.), etc.; EFKA-46, EFKA-47, EFKA-47EA, EFKA Polymer 100, EFKA Polymer 400, EFKA Polymer 401, EFKA Polymer 450 (all manufactured by Ciba Specialty Chemicals Inc.); polymer dispersants, such as Disperse Aid 6, Disperse Aid 8, Disperse Aid 15, Disperse Aid 9100, SN Dispersant 5040, 5033, 5034, 5468, 5020 (all manufactured by San Nopco Co., Ltd.); Solsperse dispersants, such as Solsperse 3000, 5000, 9000, 12000, 13240, 13940, 17000, 24000, 26000, 28000, 41000 (all manufactured by Lubrizol Corporation), etc.; dispersants, such as ADEKA PLURONIC L31, F38, L42, L44, L61, L64, F68, L72, P95, F77, P84, F87, P94, L101, P103, F108, L121, P-123 (all manufactured by ADEKA Corporation), IONETTE S-20 (manufactured by Sanyo Chemical Industries, Ltd.), DISPERBYK 101, 103, 106, 108, 109, 110, 111, 112, 116, 118, 130, 140, 142, 162, 163, 164, 166, 167, 170, 171, 174, 176, 180, 182, 184, 190, 191, 194N, 2000, 2001, 2010, 2015, 2050, 2055, 2150, 2152, 2155, 2164 (all manufactured by BYK Japan KK), etc.; dispersants, such as DEMOL EP, Poise 520, Poise 521, Poise 530, Poise 535, DEMOL P (all manufactured by Kao Corporation), etc.; polycarboxylic acid dispersants, such as Aron T-50, -6012, A-6017, AT-40H, A-6001, A-30SL, A-6114, A-210, SD-10, A-6712, A-6330, CMA-101, JULIMER (registered trademark) AC-10 NPD (all manufactured by Toagosei Co., Ltd.), Nuosperse FX-605, FX-609, FX-600, FX-504 (all manufactured by Elementis plc), etc. Moreover, as a dispersant other than the aforementioned dispersants, an oligomer or a polymer which has a polar group in the molecular end or the side chain, such as an acrylic copolymer, etc. is included. The dispersant may be used singly or in combination of two or more thereof.

Examples of the aqueous thickener include SEPIGEL 305, NS, EG, FL, SEPIPLUS 265, S, 400, SEPINOV EMT10, P88, SEPIMAX ZEN (manufactured by Seiwa Kasei Co., Ltd.); Aron A-10H, A-20P-X, A-20L, A-30, A-7075, A-7100, A-7185, A-7195, A-7255, B-300K, B-500K, JULIMER (registered trademark) AC-10LHPK, AC-10SHP, RHEODIC 260H, 845H, JUNLON PW-120 (all manufactured by Toagosei Co., Ltd.); DISPERBYK 410, 411, 415, 420, 425, 428, 430, 431, 7410ET, 7411ES, 7420ES, OPTIFLO-L1400 (all manufactured by BYK Japan KK), Cosquat GA 468 (manufactured by Osaka Organic Chemical Industry Co., Ltd.), fibrous derivative materials (such as carboxymethylcellulose, methylcellulose, hydroxycellulose, etc.), protein materials (such as casein, sodium caseinate, ammonium caseinate, etc.), alginic acid-based materials (sodium alginate, etc.), polyvinyl materials (polyvinyl alcohol, polyvinyl pyrrolidone, polyvinyl benzyl ether copolymer, etc., polyacrylic acid materials (sodium polyacrylate, a polyacrylic acid-polymethacrylic acid copolymer, etc.), polyether materials (pluronic polyether, polyether dialkyl ester, polyether dialkyl ether, a polyether urethane modified product, a polyether epoxy modified product, etc.), and maleic anhydride copolymer materials (a partially esterified product of vinyl ether-maleic anhydride copolymer, half ester of drying oil fatty acid allyl alcohol ester-maleic anhydride). As the thickener, besides the aforementioned thickners, a polyamide wax salt, acetylene glycol, zentan gum, an oligomer or a polymer having a polar group at the molecular end or the side chain may be included. The thickener may be used singly or in combination of these two or more.

The content of the aqueous polymer in the porous layer that contains the inorganic particles for a nonaqueous electrolyte battery of the present embodiment is preferably 0.1% by weight to 100% by weight with respect to the total weight of the porous layer, and more preferably 0.2% by weight to 10% by weight.

<Positive Electrode>

It is preferable that a positive electrode generally includes a current collector and a positive electrode mixture layer formed thereon, and the positive electrode mixture layer preferably includes a positive electrode active material, a conductive auxiliary agent, and a binder.

As the positive electrode active material, publicly known ones capable of electrochemically intercalating and releasing a lithium ion may be used. A material containing lithium is preferable as the positive electrode active material. Examples of the positive electrode active material include:

an oxide represented by the following Formula (1):

$$Li_xMn_{2-y}M_yO_z \quad (1)$$

{wherein, M represents at least one element selected from the group consisting of transition metal elements; 0<x≤1.3; 0.2<y<0.8; and 3.5<z<4.5.} a layered oxide represented by the following Formula (2):

$$Li_xM_yO_z \quad (2)$$

{wherein, M represents at least one element selected from the group consisting of transition metal elements; 0<x≤1.3; 0.8<y<1.2; and 1.8<z<2.2.} a spinel type oxide represented by the following Formula (3):

$$LiMn_{2-x}Ma_xO_4 \quad (3)$$

{wherein, Ma represents at least one element selected from the group consisting of transition metal elements; and 0.2≤x≤0.7.} a layered oxide positive electrode active material containing excessive Li represented by the following Formula (6), which is a complex oxide of an oxide represented by the following Formula (4) and an oxide represented by the following Formula (5):

$$Li_2McO_3 \quad (4)$$

{wherein, Mc represents at least one element selected from the group consisting of transition metal elements.}

$$LiMdO_2 \quad (5)$$

{wherein, Md represents at least one element selected from the group consisting of transition metal elements.}

$$zLi_2McO_3\text{-}(1-z)LiMdO_2 \quad (6)$$

{wherein, Mc and Md have respectively the same meanings as Mc and Md in Formulas (4) and (5), and 0.1≤z≤0.9.} an olivine type positive electrode active material represented by the following Formula (7):

$$LiMb_{1-y}Fe_yPO_4 \quad (7)$$

{wherein, Mb represents at least one element selected from the group consisting of Mn and Co; and 0≤y≤1.0}, and a compound represented by the following Formula (8):

$$Li_2MePO_4F \quad (8)$$

{wherein, Me represents at least one element selected from the group consisting of transition metal elements}. These positive electrode active materials may be used singly, or two or more thereof may be used in combination.

The positive electrode active material operable at a higher potential to increase the energy density of a battery is preferable. As for the positive electrode active material, at least one selected from the group consisting of the spinel type lithium manganese composite oxide represented by Formula (3), and the layered compound represented by Formula (2) is preferably used, because the nonaqueous electrolyte battery of the present embodiment can effectively adsorb a metal ion which may dissolve out from the positive electrode active material and deposit on the negative electrode to deteriorate the battery characteristics or cause a ort circuit, so that deterioration of the battery performance may be suppressed.

A conductive auxiliary agent, a binder, and a current collector that are publicly known in the art can be used.

The positive electrode may contain the inorganic particles for a nonaqueous electrolyte battery of the present embodiment. When the positive electrode includes the inorganic particles for a nonaqueous electrolyte battery of the present embodiment, a method thereof is not restricted, and for example, (i) a method of containing the inorganic particles for a nonaqueous electrolyte battery in the positive electrode mixture layer, or (ii) a method of forming a porous layer containing the inorganic particles for a nonaqueous electrolyte battery of the present embodiment on a of the positive electrode mixture layer. In the case of the latter method, the porous layer containing the inorganic particles for a nonaqueous electrolyte battery of the present embodiment may be formed by the same method as in the case of the porous layer described in the aforementioned section "<Separator for Nonaqueous Electrolyte Battery>", and the constitution thereof may also be the same constitution as the aforementioned porous layer.

The content of the inorganic particles for a nonaqueous electrolyte battery in the positive electrode is preferably 0.5% by volume or more with respect to the total volume (total volume excluding the pore portion) of the constituent components of the positive electrode excluding the current collector from the viewpoint of favorably securing the effect of its use, and more preferably 1% by volume or more. Moreover, from the viewpoint of the energy density of internal resistance of a battery, the content of the inorganic particles for a nonaqueous electrolyte battery in the positive electrode is preferably 10% by volume or less with respect to the total volume (total volume excluding the pore portion) of the constituent components of the positive electrode excluding the current collector, and more preferably 6% by volume or less.

When the positive electrode does not contain the inorganic particles for a nonaqueous electrolyte battery, it is preferable that with respect to the total weight of the positive electrode mixture layer, the content of the positive electrode active material is adjusted to from 87% by weight to 97% by weight, the content of the conductive auxiliary agent is adjusted to from 1.5% by weight to 6.5% by weight, and the content of the binder is adjusted to from 1.5% by weight to 6.5% by weight.

When the positive electrode contains the inorganic particles for a nonaqueous electrolyte battery, it is preferable that with respect to the total weight of the positive electrode mixture layer, the content of the positive electrode active material is adjusted to from 79.4% by weight to 96.4% by weight, the content of the conductive auxiliary agent is adjusted to from 1.4% by weight to 6.5% by weight, and the content of the binder is adjusted to from 1.4% by weight to 6.5% by weight.

<Negative Electrode>

It is preferable that a negative electrode generally includes a current collector and a negative electrode mixture layer formed thereon, and the negative electrode mixture layer preferably includes a negative electrode active material and a binder.

Although there is no particular restriction on the current collector to be included in the negative electrode, examples thereof may include a metal foil, such as copper, nickel, stainless steel, etc.; an expanded metal, a punched metal, a foamed metal; a carbon material, such as a carbon cloth, a carbon paper, etc. The current collector in the negative electrode may be used singly, or two or more thereof may be used in combination.

As the negative electrode active material, a publicly known one capable of electrochemically intercalating and releasing lithium ions may be used. There is no particular restriction on such negative electrode active material, and, for example, a carbon material, such as a graphite powder, a mesophase carbon fiber, a mesophase microsphere, a metal, an alloy, an oxide and a nitride, are included. The negative electrode active material may be used singly, or two or more thereof may be used in combination.

As a binder in the negative electrode, a publicly known binder capable of binding at least two of the negative electrode active material, the conductive auxiliary agent, and a material constituting the negative electrode of the current collector, can be used. Although there is no particular restriction on such a binder, preferable examples thereof may include carboxymethylcellulose, a crosslinked rubber latex of styrene/butadiene, an acrylic latex, and polyvinylidene difluoride. The binder may be used singly, or two or more thereof may be used in combination.

The negative electrode may contain the inorganic particle for a nonaqueous electrolyte battery of the present embodiment. When the inorganic particles for a nonaqueous electrolyte battery of the present embodiment are added to the negative electrode, a method thereof is not restricted, and for example, (i) a method of adding the inorganic particles for a nonaqueous electrolyte battery into the negative electrode mixture layer, or (ii) a method of forming a porous layer containing the inorganic particles for a nonaqueous electrolyte battery of the present embodiment on the surface of the negative electrode mixture layer. In the case of the latter method, the porous layer containing the inorganic particles for a nonaqueous electrolyte battery of the present embodiment may be formed by the same method as in the case of the porous layer described in the aforementioned section "<Separator for Nonaqueous Electrolyte Battery>", and the constitution thereof may be also the same constitution as the aforementioned porous layer.

The content of the inorganic particles for a nonaqueous electrolyte battery in the negative electrode is preferably 1.5% by volume or more with respect to the total volume (total volume excluding the pore portion) of the constituent components of the negative electrode excluding the current collector from the viewpoint of favorably securing the effect of its use, and more preferably 2% by volume or more. Moreover, from the viewpoint of the energy density of internal resistance of a battery, the content of the inorganic particles for a nonaqueous electrolyte battery in the negative electrode is preferably, 25% by volume or less with respect to the total volume (total volume excluding the pore portion) of the constituent components of the negative electrode excluding the current collector, and more preferably 15% by volume or less.

When the negative electrode does not contain the inorganic particles for a nonaqueous electrolyte battery, it is preferable that with respect to the total weight of the negative electrode mixture layer, the content of the negative electrode active material is adjusted to from 88% by weight to 99% by weight, and the content of the binder is adjusted to from 1% by weight to 12% by weight, and, when the conductive auxiliary agent is used, the content of the conductive auxiliary agent is adjusted to from 0.5% by weight to 6% by weight.

When the negative electrode contains the inorganic particles for a nonaqueous electrolyte battery, it is preferable that with respect to the total weight of the negative electrode mixture layer, the content of the negative electrode active material is adjusted to from 68% by weight to 98% by weight, and the content of the binder is adjusted to from 0.8% by weight to 11.8% by weight, and when the conductive auxiliary agent is used, the content of the conductive auxiliary agent is adjusted to from 0.9% by weight to 5.9% by weight.

<Nonaqueous Electrolyte>

Although a nonaqueous electrolyte is not restricted, it may be, for example, a solution obtained by dissolving a lithium salt in an organic solvent. There is no restriction on the lithium salt, and examples thereof include $LiPF_6$ (lithium hexafluorophosphate), $LiClO_4$, $LiBF_4$, $LiAsF_6$, $Li_2SiF_6$, $LiOSO_2C_kF_{2k+1}$ (wherein k is an integer of 1 to 8), $LiN(SO_2C_2F_{2k+1})_2$ (wherein k is an integer of 1 to 8), $LiPF_n(C_kF_{2k+1})_{6-n}$ (wherein n is an integer of 1 to 5, and k is an integer of 1 to 8), $LiPF_4(C_2O_4)$, $LiPF_2(C_2O_4)_2$, etc. Among these, as the lithium salt, LiPF$_6$ is preferable. By using LiPF$_6$, the battery characteristics and safety tend to be superior even at an elevated temperature. These lithium salts may be used singly, or two or more thereof may be used in combination.

There is no restriction on a nonaqueous solvent used for the nonaqueous electrolyte, and a publicly known solvent may be used. For example, an aprotic polar solvent is preferable.

Examples of the aprotic polar solvent include, without particular limitation thereto, cyclic carbonates, such as ethylene carbonate, propylene carbonate, 1,2-butylene carbonate, 2,3-butylene carbonate, 1,2-pentylene carbonate, 2,3-pentylene carbonate, trifluoromethylethylene carbonate, fluoroethylene carbonate, 4,5-difluoroethylene carbonate, etc.; lactones, such as γ-butyrolactone, γ-valerolactone, etc.; cyclic sulfones, such as sulfolane, etc.; cyclic ethers, such as tetrahydrofuran, dioxane, etc.; linear carbonates, such as ethyl methyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate, methyl trifluoroethyl carbonate, etc.; nitriles, such as acetonitrile, etc.; linear ethers, such as dimethyl ether, etc.; linear carboxylic acid esters, such as methyl propionate, etc.; and linear ether carbonate compounds, such as dimethoxyethane, etc. The nonaqueous electrolyte may be used singly, or two or more thereof may be used in combination.

The concentration of a lithium salt contained in a nonaqueous electrolyte is preferably 0.5 mol/L to 1.5 mol/L, more preferably 0.9 mol/L to 1.25 mol/L.

In this regard, the nonaqueous electrolyte may be a liquid electrolyte (nonaqueous electrolyte solution), or a solid electrolyte.

The nonaqueous electrolyte may contain the inorganic particles for a nonaqueous electrolyte battery of the present embodiment. The content of the inorganic particles for a nonaqueous electrolyte battery in the nonaqueous electrolyte is preferably 5 mg or more per 1 mL of the nonaqueous electrolyte from the viewpoint of favorably securing the effect of its use, and more preferably 10 mg or more.

The nonaqueous electrolyte may contain another additive as necessary. Such other additive is not particularly restricted, however, for example, lithium salts other than those listed above such as unsaturated bond-containing carbonate, halogen atom-containing carbonate, carboxylic acid anhydride, sulfur atom-containing compounds (for example, sulfide, disulfide, sulfonic acid ester, sulfite, sulfates, sulfonic acid anhydride, etc.), a nitrile group-containing compound, etc.

Specific examples of such other additive are as follows:

Lithium salts: for example, lithium monofluorophosphate, lithium difluorophosphate, lithium bis(oxalato)borate, lithium difluoro(oxalato)borate, lithium tetrafluoro(oxalato)phosphate, lithium difluorobis(oxalato)phosphate, etc;

Unsaturated bond-containing carbonate: for example, vinylene carbonate, vinyl ethylene carbonate, etc.;

Halogen atom-containing carbonate: for example, fluoroethylene carbonate, trifluoromethylethylene carbonate, etc.;

Carboxylic anhydride: for example, acetic anhydride, benzoic anhydride, succinic anhydride, maleic anhydride, etc.;

Sulfur atom-containing compounds: for example, ethylene sulfite, 1,3-propane sultone, 1,3-propene sultone, 1,4-butane sultone, ethylene sulfate, vinylene sulfate, etc.;
Nitrile group-containing compounds: for example, succinonitrile, etc.

When the nonaqueous electrolyte contains such other additives, cycle characteristics of a battery tend to be further improved.

Among them, at least one selected from the group consisting of lithium difluorophosphate and lithium monofluorophosphate is preferable from the viewpoint of further improving cycle characteristics of a battery. The content of at least one additive selected from the group consisting of lithium difluorophosphate and lithium monofluorophosphate is preferably 0.001% by weight or more with respect to 100% by weight of the nonaqueous electrolyte, more preferably 0.005% by weight or more, and furthermore preferably 0.02% by weight or more. When this content is 0.001% by weight or more, a cycle life of a lithium ion secondary battery tends to be further improved. Moreover, this content is preferably 3% by weight or less, more preferably 2% by weight or less, and furthermore preferably 1% by weight or less. When this content is 3% by weight or less, ion conductivity of the lithium ion secondary battery tends to be further improved.

The content of other additive in the nonaqueous electrolyte can be confirmed, for example, by NMR measurement, such as 31P-NMR, 19F-NMR, etc.

<Outer Package>

As an outer package, there is no restriction on it, and metal cans, such as a steel can, an aluminum can, etc., can be used. The form of the outer package may include a cylindrical form, for example, a square cylinder form, a round cylinder form, etc. Alternatively, a nonaqueous electrolyte battery may be formed using a laminated film with a deposited metal as the outer package.

<Paint for Nonaqueous Electrolyte Battery>

The paint for a nonaqueous electrolyte battery of the present embodiment comprises the inorganic particles for a nonaqueous electrolyte battery of the present embodiment. The paint for a nonaqueous electrolyte battery of the present embodiment may be, in addition to the inorganic particles for a nonaqueous electrolyte of the present embodiment, a liquid paint containing additional components such as a resin, a dispersant, water, and an organic solvent, etc. or a powder paint containing a film forming component such as a resin in addition to the inorganic particles for a nonaqueous electrolyte of the present embodiment. As the resin contained in the paint the various resins described above in connection with the constituent elements of a nonaqueous electrolyte battery may be used. The paint may be formed by a heretofore known method such as mixing, stirring, dispersing, etc.

<Resin Solid for Nonaqueous Electrolyte Battery>

The resin solid for a nonaqueous electrolyte battery of the present embodiment comprises the inorganic particles for a nonaqueous electrolyte battery of the present embodiment and a resin. As the resin contained in the resin solid, the resins described above in connection with the constituent elements of a nonaqueous electrolyte battery may be used. The resin solid may be formed by applying a known method such as kneading, mixing, extruding, and molding, and mixing the inorganic particles for a nonaqueous electrolyte battery of the present embodiment and the resin. The porous layer containing the inorganic particles of the present embodiment may also be formed using the resin solid thereof <<Manufacturing Method of Nonaqueous Electrolyte Battery>>

There is no restriction on a manufacturing method of the nonaqueous electrolyte battery of the present embodiment, and for example, a method for laminating a positive electrode and a negative electrode via a separator to prepare a laminate, or winding the laminate to prepare a roll, and housing the obtained laminate or the roll combined with an nonaqueous electrolyte into an outer package to manufacture the nonaqueous electrolyte battery. In any of the process steps, the battery is manufactured so that at least one of the positive electrode, the negative electrode, the separator, the nonaqueous electrolyte, and the outer package contains the inorganic particles for a nonaqueous electrolyte battery of the present embodiment.

Preferably the manufacturing method includes a method for laminating in the following order a positive electrode, a layer containing the inorganic particles for a nonaqueous electrolyte battery of the present embodiment, a separator, and a negative electrode to prepare a laminate, or winding the laminate to prepare a roll, and housing the obtained laminate or roll combined with an nonaqueous electrolyte into an outer package to manufacture the nonaqueous electrolyte battery. When the nonaqueous electrolyte battery is a lithium ion secondary battery, since a plurality of the constituent components of the lithium ion secondary battery are aligned by such procedure, the mobility of lithium ions is secured and the adsorption of metal ions affecting life characteristics or safety of the battery becomes pronounced.

The porous layer containing the inorganic particles for a nonaqueous electrolyte battery of the present embodiment may be formed using the solid resin for a nonaqueous electrolyte battery described above or may be formed in advance as part of the separator described above.

<<Inspection Method of Inorganic Particle for Nonaqueous Electrolyte Battery>>

The method for evaluating a metal adsorption capacity of the inorganic particles for a nonaqueous electrolyte battery of the present embodiment is an inspection method comprising the following steps: preparing a nonaqueous electrolyte solution having a metal concentration of 0.1 to 10,000 ppm by adding a metal compound to a cyclic and/or a linear carbonate solution containing 0.1 to 6.0 mol/L of $LiPF_6$ at a dew point of −40° C. or lower; preparing a nonaqueous electrolyte mixture solution in which 0.001 to 100 parts by weight of the inorganic particle for a nonaqueous electrolyte battery are added to 100 parts by weight of the nonaqueous electrolyte solution; stirring the nonaqueous electrolyte mixture solution at 0 to 45° C. for 1 second to 1000 hours; and quantifying a metal ion concentration in the aforementioned nonaqueous electrolyte mixture solution after stirring by inductively coupled plasma-atomic emission spectroscopy (ICP-AES) or inductively coupled plasma-mass spectrometry (ICP-MS).

Arbitrarily, the method may include a method for obtaining a filtrate by filtering out the nonaqueous electrolyte mixture solution after the stirring step using a filter having a pore size of 0.1 to 1.0 μm. In this case, a metal ion concentration in the filtrate can be quantified by inductively coupled plasma-atomic emission spectroscopy (ICP-AES) or inductively coupled plasma-mass spectrometry (ICP-MS).

When evaluating a separator, the inorganic particles may be added so that the amount of the inorganic particles falls within 0.001 to 100 parts by weight with respect to 100 parts of the nonaqueous electrolyte solution. The separator may be single or divided.

When $LiPF_6$ is exposed to $H_2O$ to generate HF, quantifiability of a metal adsorption capacity is reduced, it is thereby preferable to evaluate it in an atmosphere from which water is removed. As a dew point, it is preferably −40° C. or lower, more preferably −45° C. or lower, and still more preferably −50° C. or lower. Particularly, the metal adsorption capacity should be more preferably evaluated under an inert gas atmosphere, still more preferably in nitrogen gas or argon gas, and most particularly in an argon gas atmosphere.

There is no particular restriction on a composition of a mixed solution of $LiPF_6$ and a cyclic and/or a linear carbonate as long as that the composition should contain 0.1 to 6.0 mol/L of $LiPF_6$.

The nonaqueous electrolyte solution having a concentration of metal ions of 0.1 to 10,000 ppm is prepared by dissolving a metal compound in a mixed solution of a cyclic and/or a linear carbonate containing $LiPF_6$.

The metal compound is not particularly restricted, however, it contains preferably one kind or more of anions selected from trifluoromethanesulfonic acid, tetrafluoroboric acid and acetylacetonate, because they have sufficient solubility in the nonaqueous electrolyte solution and are excellent in exhibiting quantifiability of metal adsorption capacity.

There is no particular restriction on a method of dissolving the metal compound in a nonaqueous electrolyte solution, and the means such as propeller agitation, shaking agitation, mix rotor, vortex, ultrasonic waves, etc., are preferably applied.

From the viewpoint of quantification accuracy, a concentration of the metal ion in the aforementioned electrolyte solution is preferably higher than a certain concentration, i.e., preferably 0.5 ppm or more, and more preferably 3 ppm or more. The upper limit thereof is preferably 10,000 ppm or less, preferably 5,000 ppm or less, and more preferably 1,000 ppm or less, in order to reproduce the actual state in a battery.

The container used for a reaction is not particularly restricted as long as it has chemical resistance, particularly acid resistance.

From the viewpoint of quantification accuracy, the amount of inorganic particle is preferably higher than a certain concentration, i.e., preferably more than 0.01 parts by weight, and more preferably more than 0.02 parts by weight with respect to 100 parts by weight of the nonaqueous electrolyte solution. Moreover, the upper limit thereof is preferably 100 parts by weight or less, more preferably 50 parts by weight or less, and still more preferably 30 parts by weight or less from the viewpoint of not impairing flowability of the nonaqueous electrolyte solution. The temperature of the adsorption reaction is preferably 0° C. or higher, and more preferably 20° C. or higher, from the viewpoint of flowability, and the upper limit is preferably a temperature at which the nonaqueous electrolyte solution hardly evaporates. The temperature thereof is preferably 80° C. or lower, more preferably 70° C. or lower, and still more preferably 60° C. or lower.

Further, in order not to induce concentration gradient of the metal ion in the nonaqueous electrolyte solution, it is preferable to stir the system invariably by means of propeller agitation, shaking agitation, mix rotor, vortex, ultrasonic waves, etc., however the agitation method is not particularly restricted. The stirring time is preferably 1 second or longer, more preferably 1 hour or longer, and still more preferably 5 hours or longer, from the viewpoint of sufficient adsorption. Moreover, the upper limit thereof is preferably 1000 hours or shorter, more preferably 100 hours or shorter, and still more preferably 80 hours or shorter, from the viewpoint of evaluation throughput.

When powder remains in the nonaqueous electrolyte after stirring, it is preferable to use a filter. For example, a membrane filter can be used. The pore size is preferably 0.1 to 1.0 μm from the viewpoint of filtration. In order to reliably filter out particles, the filter size is more preferably 0.5 μm or less, and still more preferably 0.2 μm or less. The lower limit is preferably 0.1 μm or more from the viewpoint of evaluation throughput. There is no particular restriction on a type of filters that can be used as long as powder filtration can be achieved as described above. For example, a membrane filter made of PP, PTFE, etc. can be used.

When powder does not dust from a separator, a filtration step is not essential. On the other hand, it is preferable to apply filtration step in case of dusting.

The measurement of the metal ion concentration in the filtrate is not particularly restricted as long as the metal ion can be quantified. For example, chelating titration, ion chromatography, atomic absorption spectrometry, inductively coupled plasma spectrometry (IPC-AES), inductively coupled plasma mass spectrometry (ICP-MS), capillary electrophoresis, an ion selective electrode method, fluorescent X-ray analysis, etc., can be used. From the viewpoint of quantitativity for a micro amount, inductively coupled plasma spectroscopy (IPC-AES) or inductively coupled plasma mass spectrometry (ICP-MS) is preferable.

When evaluating the metal ion adsorption capacity of a separator, by passing an electrolyte solution containing a known concentration of the metal ions through the separator as a membrane material, the metal ion concentration in the electrolyte solution after passing may be measured. For example, the metal ion adsorption capacity of the inorganic particles can be measured by placing a separator on a Swinex holder, pumping the electrolyte using a syringe, and measuring the metal ion concentration of the electrolyte solution that passed through the separator.

From the viewpoint of throughput, the amount per unit time of the electrolyte solution passing through a unit area of the separator is preferably 100 ml/h/m2 or more, preferably 500 ml/h/m2 or more, and more preferably 1,000 ml/h/m2 or more. The upper limit thereof is preferably 10,000,000 ml/h/m2 or less, more preferably 5,000,000 ml/h/m2 or less, and more preferably 1,000,000 ml/h/m2 or less, from the viewpoint of adsorbing the metal ions to the separator.

From the viewpoint of quantitativity of the metal ions, it is preferable that a metal ion concentration is measured for 10 μl or more of the electrolytic solution that are collected after passing through the separator, the measurement is repeated several times and then the measurement values obtained are averaged. The sample amount is more preferably 100 μl or more, and more preferably 500 μl or more. Further, from the viewpoint of throughput, the upper limit thereof is preferably 1 l or less, more preferably 500 ml or less, and still more preferably 250 ml or less.

EXAMPLES

The present invention will be described below in more detail by way of Examples, provided that the present invention be not limited to the Examples. In addition, various measurements and evaluations were carried out under conditions of room temperature 23° C., 1 atm, and relative humidity 50% unless otherwise specified.

Example 1

<Preparation of Hydroxyapatite>
Hydroxyapatite was synthesized by heating and stirring a 10% aqueous suspension of calcium hydrogen phosphate dihydrate and calcium carbonate at 90° C. At this time, the mole ratio of Ca to P was Ca:P=5:3. The obtained solid was vacuum dried at 120° C. to obtain powder hydroxyapatite A. In addition, the average thickness of 100 particles observed with a transmission electron microscope was 150 nm.

<BET Specific Surface Area Measurement>
With respect to the hydroxyapatite A obtained, an adsorption isotherm by nitrogen was measured by a constant volume method. Nitrogen was supplied to the glass tube containing the pretreated inorganic particles at an adsorption temperature while the relative pressure of nitrogen was increased until the relative pressure of nitrogen was about 0.5. The amount of adsorption of nitrogen to the inorganic particles was measured while water vapor was supplied to obtain an adsorption isotherm. The adsorption isotherm was obtained from the amount of adsorption of nitrogen to the inorganic particles in the step of increasing the relative nitrogen pressure, and the relative nitrogen pressure.

From the obtained adsorption isotherm, the BET specific surface area was calculated by a BET method (multipoint method, 5 points in the range of relative pressure about 0.1 to 0.2). The BET specific value of hydroxyapatite A obtained was 6.5 m$^2$/g.

(Apparatus)
Measuring device: BELSORP-mini (manufactured by Nippon Bell Co., Ltd.)
Pretreatment device: BELPREP-vac II (manufactured by Nippon Bell Co., Ltd.)
(Pretreatment Method)
Inorganic particles placed in a glass tube were subjected to vacuum deareration at 200° C. for 8 hours.
(Measurement Conditions)
Adsorption temperature: 77K
Adsorbent: nitrogen
Saturated vapor pressure: measured value
Adsorbate cross section: 0.162 nm$^2$
Equilibrium waiting time: 500 sec
The equilibrium waiting time is a waiting time after reaching the adsorption equilibrium state (a state in which the pressure change at adsorption/desorption becomes less than a prescribed value)

<X-Ray Diffraction Measurement>
Powder X-ray diffraction measurement for the obtained hydroxyapatite A was carried out using an X-ray diffractometer (D2 PHASER, manufactured by Bruker Corporation) using Cu—Kα ray, under the conditions of accelerating voltage of 30 kV, tube current of 10 mA, divergence slit of 1 mm, Soller slit of 4°, air scatter screen of 1 mm, Kβ filter of 0.5 mm, counting time of 0.15 sec, 0.02° step, and measurement range of 5° to 40°. A standard silicon powder was used for correction of the X-ray diffractometer. The diffraction pattern obtained is shown in FIG. 1. From this diffraction pattern, a diffraction peak derived from the (002) plane in the vicinity of 25.9° (2θ) and a diffraction peak derived from the (300) plane in the vicinity of 32.8° (2θ), were observed, which were identified as the structure of hydroxyapatite. In addition, the half width of the diffraction peak derived from the (002) plane was 0.14°.

<Preparation of Separator>
A polyolefin resin mixture was obtained by dry-blending 47.5 parts by weight of a polyethylene homopolymer with the viscosity-average molecular weight (Mv) of 700,000, 47.5 parts by weight of a polyethylene homopolymer with Mv 250,000; and 5 parts by weight of a polypropylene homopolymer with Mv 400,000 using a tumbler blender. Further, 1% by weight of pentaerythrityl-tetrakis[3-(3,5-di-t-butyl-4-hydroxyphenyl)propionate] was added as an antioxidant to 99% by weight of the obtained polyolefin resin mixture and the two were dry-blended gain using a tumbler blender to obtain a polyolefin resin composition.

After purging with nitrogen, the obtained polyolefin resin composition was fed to a twin-screw extruder with a feeder in a nitrogen atmosphere. Moreover, a liquid paraffin (kinematic viscosity at 37.78° C.: $7.59 \times 10^{-5}$ m$^2$/s) was injected into the extruder cylinder by a plunger pump. The feeder and the pump were adjusted such that the liquid paraffin content ratio in the entire mixture that were melt-kneaded and extruded by the twin-screw extruder was 66% by weight (the resin composition concentration was 34%). The melt kneading conditions were: set temperature of 200° C., screw rotation speed of 100 rpm, and discharge rate of 12 kg/h.

Subsequently, the melt-kneaded product was extruded through a T-die and cast on a cooling roll regulated at a surface temperature of 25° C. to obtain a gel sheet with a thickness of 1,600 μm. Next, the obtained gel sheet was guided to a simultaneous biaxial tenter stretching machine and stretched biaxially. The set stretching conditions were: MD stretching ratio of 7.0, TD stretching ratio of 6.1, and set temperature of 123° C. Next, the gel sheet after biaxial stretching was guided to an ethyl methyl ketone tank, sufficiently immersed in ethyl methyl ketone to extract and remove liquid paraffin, and then ethyl methyl ketone was removed by drying. Finally, the dried gel sheet was guided to a TD tenter and stretched and thermally relaxed to obtain a polyolefin microporous membrane. The stretching temperature was 125° C., the thermal relaxation temperature was 133° C., the TD maximum stretching ratio was 1.65, and the relaxation rate was 0.9. The obtained polyolefin microporous membrane had a thickness of 12 μm and a porosity of 40%.

29 parts by weight of the inorganic particles of hydroxyapatite A and boehmite (average thickness: 250 nm) at the weight ratio of 40 and 60, and 0.29 parts by weight of a polycarboxylate ammonium aqueous solution (SN Dispersant 5468, manufactured by San Nopco CO., Ltd.) were mixed in 100 parts by weight of ion exchanged water. After mixing, a bead milling treatment was carried out to adjust the average particle diameter (D50) to 1.5 μm to obtain a dispersion. Further, to 100 parts by weight of the obtained dispersion, 2.2 parts by weight of an acrylic latex suspension (solid content concentration of 40%, and average particle diameter of 150 nm) was added as a binder, and the two were mixed to prepare a uniform composition for a porous layer. In this regard, the average particle diameter of the inorganic particles in the above dispersion was determined by measuring the particle size distribution using a laser particle size distribution analyzer (Microtrac MT 3300 EX, manufactured by Nikkiso Co., Ltd.), and calculating a particle diameter at which the volume cumulative frequency is 50% as the average secondary particle diameter (μm). Moreover, the average particle size of the resin latex binder was determined by measuring a volume average particle diameter (nm) as the average particle diameter using a particle diameter measuring apparatus (MICROTRACTMUPA 150 manufactured by Leed & Northrup Co.) based on a light scattering method.

Next, the composition for forming a porous layer was coated on the surface of the polyolefin microporous membrane using a micro gravure coater, dried at 60° C. to remove water, and a 5 μm-thick inorganic particle-containing layer containing boehmite and hydroxyapatite A was placed on the polyolefin microporous membrane to obtain a separator that has the inorganic particle-containing layer. In the separator, the volume ratio of the inorganic particles in the inorganic particle-containing layer containing boehmite and the hydroxyapatite A was 95% by volume.

<Production of Positive Electrode>

$LiNi_{0.5}Co_{0.2}Mn_{0.3}O_2$ as the positive electrode active material, an acetylene black powder as the conductive auxiliary agent, and a polyvinylidene difluoride solution as the binder were mixed at weight ratio of solid contents of 93.9/3.3/2.8. To the obtained mixture, N-methyl-2-pyrrolidone was added as a dispersion solvent to a solid content of 35% by weight and the mixture was further mixed to prepare a slurry-like solution. The slurry-like solution was coated on both sides of a 10 μm thick aluminum foil. In doing so, a part of the aluminum foil was exposed. Thereafter, the solvent was removed by drying and rolling was carried out with a roll press. The sample after rolling was trimmed such that the size of the coated part was 30 mm×50 mm, and the exposed part of the aluminum foil was included, and an aluminum lead piece for taking out current was welded to the exposed part of the aluminum foil thereby obtaining a positive electrode.

<Preparation of Negative Electrode>

A graphite powder as the negative electrode active material, and a styrene butadiene rubber and a carboxymethylcellulose aqueous solution as the binder were mixed at a weight ratio of solid contents of 97.5/1.5/1.0. The obtained mixture was added to water as a dispersion solvent such that the solid content concentration was 45% by weight to prepare a slurry-like solution. The slurry-like solution was coated on one side or both sides of a 10 μm-thick copper foil. In doing so, a part of the aluminum foil was exposed. Thereafter, the solvent was removed by drying and rolled with a roll press. The sample after rolling was trimmed such that the size of the coated part was 32 mm×52 mm, and the exposed part of the copper foil was included, and a nickel lead piece for taking out current was welded to the exposed part of the copper foil thereby obtaining a negative electrode.

<Preparation of Nonaqueous Electrolyte>

$LiPF_6$ was dissolved at 1 mol/L in a mixed solvent in which ethylene carbonate (EC) and ethyl methyl carbonate (EMC) were mixed at a volume ratio of 1/2 in an argon gas atmosphere, to obtain a nonaqueous electrolyte (nonaqueous electrolytic solution).

<Preparation of Nonaqueous Electrolyte Battery>

The positive electrode and the negative electrode were combined through the intermediary of the separator to form a laminated electrode body. The separator was disposed such that an inorganic particle-containing layer containing boehmite and hydroxyapatite A faced the positive electrode. The laminated electrode body was inserted into an aluminum laminate outer package of 80×60 cm. Next, the nonaqueous electrolyte (nonaqueous electrolytic solution) was injected into the outer package, and then the opening of the outer package was closed to complete a nonaqueous electrolyte battery (lithium ion secondary battery) having internally a laminated electrode body. The rated capacity of the obtained nonaqueous electrolyte battery was 90 mAh.

<Evaluation of Metal Adsorption Capacity>

(1) Evaluation of Mn Adsorption Capacity

Manganese trifluoromethanesulfonate [Mn $(CF_3SO_3)_2$] was dissolved in the nonaqueous electrolyte used in the aforementioned nonaqueous electrolyte battery under an argon gas atmosphere so that the concentration of Mn was 5 ppm. Then 100 parts by weight of the nonaqueous electrolyte in which Mn was dissolved, and 0.035 parts by weight of hydroxyapatite A were placed in a hermetically closed container made of polypropylene, which was shaken with a variable mix rotor VMR-5R (manufactured by AS One Corporation) at 100 rpm for 6 hours under an atmosphere of 23° C. Thereafter, filtration was carried out with a membrane filter made of PTFE having a pore size of 0.2 μm. The Mn ion concentration (Mx) (unit: ppm) in the filtrate was measured and an adsorption ratio (Ax) (unit: %) was calculated by the following equation:

$$Ax=[(5-Mx)/5]\times 100$$

where the concentration of Mn was measured by ICP emission spectrometry (ICP emission spectrometer: Optima 8300 (manufactured by Perkin Elmer, Inc.)). In addition, acid decomposition (microwave method) was conducted for pretreatment of the measurement sample.

When the adsorption ratio (Ax) was less than 10%, the adsorption ratio was rated as "poor". When it was 10% to 20%, Ax was rated as "fair", and when it was 20% or greater, Ax was rated as "good".

(2) Measurement of Co Adsorption Capacity

The Co adsorption ratio was calculated and evaluated in the same manner as the measurement of the Mn adsorption capacity described above except that cobalt (II) acetylacetonate was used instead of manganese trifluoromethanesulfonate.

(3) Measurement of Cu Adsorption Capacity

The Cu adsorption ratio was calculated and evaluated in the same manner as the measurement of the Mn adsorption capacity described above except that copper trifluoromethanesulfonate [Cu $(CF_3SO_3)_2$] was used instead of manganese trifluoromethanesulfonate.

(4) Measurement of Zn Adsorption Capacity

The Zn adsorption ratio was calculated and evaluated in the same manner as in the measurement of the abovementioned Mn adsorption capacity except that zinc trifluoromethanesulfonate [Zn $(CF_3SO_3)_2$] was used instead of manganese trifluoromethanesulfonate.

<Evaluation of Life Characteristics/Safety>

Initial Charge and Discharge

The obtained nonaqueous electrolyte secondary battery (hereinafter, also simply referred to as "battery") was placed in a thermostatic chamber (thermostatic chamber PLM-73S, manufactured by Futaba Co., Ltd.) set at 25° C., and connected to a charge/discharge apparatus (charge/discharge apparatus ACD-01, manufactured by Aska Electronic Co., Ltd.). Next, the battery was charged with a constant current of 0.05 C until the voltage reached 4.35V, and then charged with a constant voltage of 4.35V for 2 hours followed by discharge to 3.0V with a constant current of 0.2 C. In this regard, 1 C is a current value at which the battery is discharged in 1 hour.

Float Test

The battery after the initial charge was placed in a thermostatic chamber (thermostatic chamber PLM-73S, manufactured by Futaba Co., Ltd.) set at 50° C., and connected with a charging/discharging device (charge/discharge apparatus ACD-01, manufactured by Aska Electronic Co., Ltd.). Next, the battery was charged at a constant current of 0.5 C until the voltage reached 4.35 V, thereafter charged with a constant voltage of 4.35 V. In doing so, a duration of time until a micro short circuit occurred was evaluated.

Regarding the time until a micro short circuit occurred, the time until the charge capacity was at least 2 times as high as the rated capacity in the aforementioned charging step, was measured, and a case, in which the time was less than 30 days was rated as "Very poor", a case, in which it was 30 days to less than 40 days was rated as "Poor", a case, in which the time was 40 days or longer to less than 50 days was rated as "Fair", a case, in which the time was 50 days or longer to less than 60 days was rated as "Good", a case, in which it was 60 days or longer to less than 70 days was rated as "Excellent", and a case, in which the time was 70 days or longer was rated as "Extremely excellent"

Example 2

Hydroxyapatite B was synthesized in the same manner as in Example 1 except that a heating temperature of an aqueous suspension was 80° C. The BET specific surface area of hydroxyapatite B obtained was 52 $m^2/g$. The average thickness of 100 particles observed with a transmission electron microscope was 140 nm. In addition, X-Ray diffraction measurement was carried out in the same manner as in Example 1. The diffraction pattern obtained is shown in FIG. 1. From this diffraction pattern, a diffraction peak derived from the (002) plane in the vicinity of 25.9° (2θ) and a diffraction peak derived from the (300) plane in the vicinity of 32.8° (2θ), were observed, which were identified as the structure of hydroxyapatite. In addition, the half width of the diffraction peak derived from the (002) plane was 0.18°.

A separator having an inorganic particle-containing layer containing boehmite (average thickness: 250 nm) and hydroxyapatite B was obtained by the same manner as in Example 1 except that hydroxyapatite B was used instead of hydroxyapatite A. In the separator, the volume ratio of the inorganic particles in the inorganic particle-containing layer containing boehmite and hydroxyapatite B in this separator was 95% by volume. Further, in the same manner as in Example 1, the metal adsorption capacity and life characteristics/safety evaluation were performed.

Example 3

Hydroxyapatite C was synthesized by calcinating hydroxyapatite B in an air atmosphere at 1000° C. for 5 hours and pulverizing it. The BET specific surface area of hydroxyapatite C obtained was 7 $m^2/g$. Moreover, the average thickness of 100 particles observed with a transmission electron microscope was 145 nm. In addition, X-Ray diffraction measurement was carried out in the same manner as in Example 1. The diffraction pattern obtained is shown in FIG. 1. From this diffraction pattern, a diffraction peak derived from the (002) plane in the vicinity of 25.9° (2°) and a diffraction peak derived from the (300) plane in the vicinity of 32.8° (2°), were observed, which were identified as the structure of hydroxyapatite. In addition, the half width of the diffraction peak derived from the (002) plane was 0.14°.

A separator having the inorganic particle-containing layer containing boehmite (average thickness: 250 nm) and hydroxyapatite C was obtained by the same manner as in Example 1 except that hydroxyapatite C was used instead of hydroxyapatite A. In the separator, the volume ratio of the inorganic particles in the inorganic particle-containing layer containing boehmite and hydroxyapatite C was 95% by volume. Further, in the same manner as in Example 1, the metal adsorption capacity and life characteristics/safety evaluation were performed.

Example 4

A separator having an inorganic particle-containing layer containing solely hydroxyapatite A was obtained by the same manner as in Example 1 except that hydroxyapatite A was used as the inorganic particles. In the separator, the volume ratio of the inorganic particles in the inorganic particle-containing layer containing hydroxyapatite A was 90% by volume.

Further, in the same manner as in Example 1, the metal adsorption capacity and life characteristics/safety evaluation were performed. It is noted that the metal adsorption capacity obtained in Example 1 was used as the measurement result on the metal adsorption capacity.

Example 5

A separator having an inorganic particle-containing layer containing boehmite and hydroxyapatite A was obtained by the same manner as in Example 1 except that the average thickness of boehmite was 150 nm instead of 250 nm. In the separator, the volume ratio of the inorganic particles in the inorganic particle-containing layer containing boehmite and hydroxyapatite A was 95% by volume. Further, in the same manner as in Example 1, a metal adsorption capacity and life characteristics/safety evaluation were performed. It is noted that the metal adsorption capacity obtained in Example 1 was used as the measurement result on the metal adsorption capacity.

Example 6

A separator having an inorganic particle-containing layer containing boehmite and hydroxyapatite A was obtained by the same manner as in Example 1 except that the average thickness of boehmite was 100 nm instead of 250 nm. In the separator, the volume ratio of the inorganic particles in the inorganic particle-containing layer containing boehmite and hydroxyapatite A was 95% by volume. Further, in the same manner as in Example 1, a metal adsorption capacity and life characteristics/safety evaluation were performed. It is noted that the metal adsorption capacity obtained in Example 1 was used as the measurement result on the metal adsorption capacity.

Comparative Example 1

A separator having an inorganic particle-containing layer containing zeolite in the same manner as in Example 1 except that zeolite (specific surface area: 550 m$^2$/g) was used as the inorganic particles. In the separator, the volume ratio of the inorganic particles in the inorganic particle-containing layer containing zeolite was 97% by volume.

Further, in the same manner as in Example 1, the metal adsorption capacity and life characteristics/safety evaluation were performed.

Comparative Example 2

A separator having an inorganic particle-containing layer containing aluminum silicate in the same manner as in Example 1 except that aluminum silicate ($Al_2O_3.2SiO_2$) was used as the inorganic particles. In the separator, the volume ratio of the inorganic particles in the inorganic particle-containing layer containing aluminum silicate was 97% by volume.

Further, in the same manner as in Example 1, the metal adsorption capacity and life characteristics/safety evaluation were performed.

Comparative Example 3

A separator having an inorganic particle-containing layer containing boehmite in the same manner as in Example 1 except that boehmite (average thickness: 250 nm) was used as the inorganic particles. In the separator, the volume ratio of the inorganic particles in the inorganic particle-containing layer containing boehmite was 97% by volume.

Further, in the same manner as in Example 1, the metal adsorption capacity and life characteristics/safety evaluation were performed.

Comparative Example 4

Hydroxyapatite D was synthesized in the same manner as in Example 1 except that a heating temperature of an aqueous suspension was 60° C. The BET specific surface area of hydroxyapatite D obtained was 96 m$^2$/g. The average thickness of 100 particles observed with a transmission electron microscope was 110 nm. In addition, X-Ray diffraction measurement was carried out in the same manner as in Example 1. The diffraction pattern obtained is shown in FIG. 1. From this diffraction pattern, a diffraction peak derived from the (002) plane in the vicinity of 25.9° (2°) and a diffraction peak derived from the (300) plane in the vicinity of 32.8° (2°), were observed, which were identified as the structure of hydroxyapatite. In addition, the half width of a diffraction peak derived from the (002) plane was 0.35°.

A separator having an inorganic particle-containing layer containing boehmite and hydroxyapatite D in the same manner as in Example 1 except that hydroxyapatite D and boehmite (average thickness: 250 nm) at a weight ratio of 50 and 50 were used as inorganic particles. In the separator, the volume ratio of the inorganic particles in the inorganic particle-containing layer containing boehmite and hydroxyapatite D was 94% by volume. Further, in the same manner as in Example 1, the metal adsorption capacity and life characteristics/safety evaluation were performed.

Comparative Example 5

A separator having an inorganic particle-containing layer containing boehmite and hydroxyapatite D in the same manner as in Example 1 except that hydroxyapatite D and boehmite (average thickness: 110 nm) at a weight ratio of 50 and 50 were used as inorganic particles. In the separator, the volume ratio of the inorganic particles in the inorganic particle-containing layer containing boehmite and hydroxyapatite D was 93% by volume. Further, in the same manner as in Example 1, the metal adsorption capacity and life characteristics/safety evaluation were performed. It is noted that metal the adsorption capacity obtained in Comparative example 4 was used as the measurement result on the metal adsorption capacity.

Comparative Example 6

A separator having an inorganic particle-containing layer containing boehmite and hydroxyapatite D in the same manner as in Example 1 except that hydroxyapatite D and boehmite (average thickness: 80 nm) at a weight ratio of 50 and 50 were used as inorganic particles. In the separator, the volume ratio of the inorganic particles in the inorganic particle-containing layer containing boehmite and hydroxyapatite D was 91% by volume. Further, in the same manner as in Example 1, the metal adsorption capacity and life characteristics/safety evaluation were performed. It is noted that the metal adsorption capacity obtained in Comparative example 4 was used as the measurement result on the metal adsorption capacity.

Comparative Example 7

Fluoroapatite A was synthesized by heating and stirring a 10% aqueous suspension of calcium hydrogen phosphate dihydrate, calcium carbonate and calcium fluoride at 60° C. At this time, the mole ratio of Ca and P was Ca:P=5:3. The obtained solid was vacuum dried at 120° C. to obtain powder fluoroapatite A. The BET specific surface area of fluoroapatite A obtained was 110 m²/g. In addition, the average thickness of 100 particles observed with a transmission electron microscope was 100 nm.

A separator having an inorganic particle-containing layer containing boehmite (average thickness: 250 nm) and fluoroapatite A in the same manner as in Example 1 except that fluoroapatite A was used instead of hydroxyapatite D. In the separator, the volume ratio of the inorganic particles in the inorganic particle-containing layer containing boehmite and fluoroapatite A was 93% by volume. Further, in the same manner as in Example 1, the metal adsorption capacity and life characteristics/safety evaluation were performed.

Comparative Example 8

A separator having an inorganic particle-containing layer containing boehmite and fluoroapatite A in the same manner as in Example 1 except that fluoroapatite A and boehmite (average thickness: 250 nm) at a weight ratio of 40 and 60 were used as inorganic particles. In the separator, the volume ratio of the inorganic particles in the inorganic particle-containing layer containing boehmite and fluoroapatite A was 94% by volume. Further, in the same manner as in Example 1, the metal adsorption capacity and life characteristics/safety evaluation were performed. It is noted that the metal adsorption capacity obtained in Comparative example 7 was used as the measurement result on the metal adsorption capacity.

The measurement and evaluation results of Examples 1 to 6 and Comparative Examples 1 to 8 are presented in the following Tables 1 and 2.

TABLE 2

| | Life characteristics/safety | Metal adsorption evaluation | | | |
|---|---|---|---|---|---|
| | | Mn | Co | Cu | Zn |
| Example. 1 | Extremely excellent | Good | Good | Good | Good |
| Example. 2 | Excellent | Good | Good | Good | Good |
| Example. 3 | Extremely excellent | Good | Good | Good | Good |
| Example. 4 | Good | Good | Good | Good | Good |
| Example. 5 | Fair | Good | Good | Good | Good |
| Example. 6 | Fair | Good | Good | Good | Good |
| Comparative exam. 1 | Very poor | Poor | Poor | Poor | Poor |
| Comparative exam. 2 | Very poor | Poor | Poor | Poor | Poor |
| Comparative exam. 3 | Very poor | Poor | Poor | Poor | Poor |
| Comparative exam. 4 | Poor | Fair | Fair | Fair | Fair |
| Comparative exam. 5 | Poor | Fair | Fair | Fair | Fair |
| Comparative exam. 6 | Poor | Fair | Fair | Fair | Fair |
| Comparative exam. 7 | Very poor | Poor | Poor | Poor | Poor |
| Comparative exam. 8 | Very poor | Poor | Poor | Poor | Poor |

INDUSTRIAL APPLICABILITY

The inorganic particles for a nonaqueous electrolyte secondary battery of the present invention may be used as a nonaqueous electrolyte battery, for example, a lithium ion secondary battery. The inorganic particles for a nonaqueous electrolyte secondary battery of the present invention can be preferably used as a separator for a nonaqueous electrolyte battery, for example, a separator for a lithium ion secondary battery.

The invention claimed is:

1. Inorganic particles for a nonaqueous electrolyte battery, comprising a cation exchanger having a highly crystallized one-dimensional tunnel-like crystal structure, wherein:

the inorganic particles show a peak derived from the one-dimensional tunnel-like crystal structure in X-ray diffraction measurement using Cu—Kα ray as a light source, and a half width of the peak is 0.3° or less; and

TABLE 1

| | Inorganic particles | | | | | | |
|---|---|---|---|---|---|---|---|
| | Cation exchanger having one-dimensional tunnel-like crystalline structure | Average thickness (nm) of cation exchanger having one-dimensional tunnel-like crystalline structure | Inorganic particle for mixing | Average thickness (nm) of inorganic particle for mixing | Other inorganic particle | Content (weight %) of cation exchanger having one-dimensional tunnel-like crystalline structure | Half width of diffraction peak of (002) plane |
| Example. 1 | Hydroxyapatite A | 150 | Boehmite | 250 | | 40 | 0.14 |
| Example. 2 | Hydroxyapatite B | 140 | Boehmite | 250 | | 40 | 0.18 |
| Example. 3 | Hydroxyapatite C | 145 | Boehmite | 250 | | 40 | 0.14 |
| Example. 4 | Hydroxyapatite A | 150 | — | — | | 100 | 0.14 |
| Example. 5 | Hydroxyapatite A | 150 | Boehmite | 150 | | 40 | 0.14 |
| Example. 6 | Hydroxyapatite A | 150 | Boehmite | 100 | | 40 | 0.14 |
| Comparative exam. 1 | — | — | — | — | Zeolite | 0 | — |
| Comparative exam. 2 | — | — | — | — | Aluminum silicate | 0 | — |
| Comparative exam. 3 | — | — | Boehmite | 250 | | 0 | — |
| Comparative exam. 4 | Hydroxyapatite D | 110 | Boehmite | 250 | | 50 | 0.35 |
| Comparative exam. 5 | Hydroxyapatite D | 110 | Boehmite | 110 | | 50 | 0.35 |
| Comparative exam. 6 | Hydroxyapatite D | 110 | Boehmite | 80 | | 50 | 0.35 |
| Comparative exam. 7 | Hydroxyapatite A | 100 | Boehmite | 250 | | 50 | 0.35 |
| Comparative exam. 8 | Hydroxyapatite A | 100 | Boehmite | 250 | | 40 | 0.35 | the inorganic particles further contain inorganic particles for mixing, and an average thickness of the inorganic particles for mixing is thicker than that of the cation exchanger.

2. The inorganic particles for a nonaqueous electrolyte battery according to claim 1, wherein the cation exchanger having the highly crystallized one-dimensional tunnel-like crystal structure is one or more selected from the group consisting of hydroxyapatite, fluoroapatite, chlorapatite, protonated albite, manganese oxide, β-alumina, potassium hexatitanate, potassium tungstate, potassium molybdate, octotitanate, and gallotitanogallate.

3. The inorganic particles for a nonaqueous electrolyte battery according to claim 1, wherein the cation exchanger having the highly crystallized one-dimensional tunnel-like crystal structure is hydroxyapatite, and the hydroxyapatite has a diffraction peak of the (002) plane within a diffraction angle (2θ) of from 25.5 to 26.5° and a diffraction peak of the (300) plane within a diffraction angle (2θ) of from 32.5 to 33.5°, and a half width of the diffraction peak of the (002) plane is 0.3° or less, in an X-ray diffraction pattern by X-ray diffraction measurement using Cu—Kα ray as a light source.

4. The inorganic particles for a nonaqueous electrolyte battery according to claim 3, wherein the half width of the diffraction peak of the (002) plane is 0.15° or less.

5. The inorganic particles for a nonaqueous electrolyte battery according to claim 1, wherein a BET specific surface area is 3 $m^2/g$ or more.

6. The inorganic particles for a nonaqueous electrolyte battery according to claim 1, wherein an adsorption rate of $Mn^{2+}$ ions to the inorganic particles for a nonaqueous electrolyte battery is 10% or more, when 0.035 parts by weight of the inorganic particles for a nonaqueous electrolyte battery is immersed in 100 parts by weight of a mixed solution of 5 ppm of $Mn^{2+}$ ions, 1 mol/L of $LiPF_6$, and a cyclic and/or a linear carbonate at 23° C. for 6 hours.

7. The inorganic particles for a nonaqueous electrolyte battery according to claim 1, wherein the inorganic particles for mixing are an anion exchanger.

8. The inorganic particles for a nonaqueous electrolyte battery according to claim 1, wherein an amount of the inorganic particles for mixing is less than 50% by weight based on 100% by weight of the total weight of the cation exchanger and the inorganic particles for mixing.

9. A battery constituent material comprising the inorganic particles for a nonaqueous electrolyte battery according to claim 1.

10. A nonaqueous electrolyte battery comprising an inorganic particle-containing layer containing the inorganic particles for a nonaqueous electrolyte battery according to claim 1.

11. A separator for a nonaqueous electrolyte battery, comprising the inorganic particle-containing layer according to claim 10 on at least one surface of the separator.

12. A nonaqueous electrolyte battery comprising a positive electrode, a negative electrode, a separator, a nonaqueous electrolyte, and an outer package, wherein at least one of the positive electrode, the negative electrode, the separator, the nonaqueous electrolyte, and the outer package contains the inorganic particles for a nonaqueous electrolyte battery according to claim 1.

13. The nonaqueous electrolyte battery comprising the positive electrode, the negative electrode, and the separator according to claim 12, wherein an inorganic particle-containing layer is formed partially or entirely from at least one selected from: inside of the separator, between the positive electrode and the negative electrode, or between the negative electrode and the separator.

14. The nonaqueous electrolyte battery according to claim 13, wherein the inorganic particle-containing layer is formed partially or entirely between the positive electrode and the separator.

15. A separator for a nonaqueous electrolyte battery, comprising the inorganic particles for a nonaqueous electrolyte battery according to claim 1.

16. A paint for a nonaqueous electrolyte battery, comprising the inorganic particles for a nonaqueous electrolyte battery according to claim 1.

17. A resin solid material for a nonaqueous electrolyte battery, comprising the inorganic particles for a nonaqueous electrolyte battery according to claim 1, and a resin.

18. A lithium ion secondary battery comprising a laminated body or a roll of the laminated body, and a nonaqueous electrolyte, wherein a positive electrode, an inorganic particle-containing layer comprising the inorganic particles for a nonaqueous electrolyte battery according to claim 1, a separator, and a negative electrode are laminated in this order.

* * * * *